United States Patent
Kwon et al.

(10) Patent No.: US 10,784,948 B2
(45) Date of Patent: *Sep. 22, 2020

(54) APPARATUS AND METHOD FOR BEAM FAILURE RECOVERY

(71) Applicant: Futurewei Technologies, Inc., Plano, TX (US)

(72) Inventors: Young Hoon Kwon, San Diego, CA (US); Bin Liu, San Diego, CA (US); Pengfei Xia, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,779

(22) Filed: Sep. 4, 2019

(65) Prior Publication Data
US 2020/0169310 A1 May 28, 2020

Related U.S. Application Data

(63) Continuation of application No. 15/785,834, filed on Oct. 17, 2017, now Pat. No. 10,411,784.

(60) Provisional application No. 62/543,175, filed on Aug. 9, 2017.

(51) Int. Cl.
*H04B 7/06* (2006.01)
*H04W 72/08* (2009.01)
*H04W 72/04* (2009.01)
*H04W 74/08* (2009.01)
*H04W 74/00* (2009.01)

(52) U.S. Cl.
CPC ........ *H04B 7/0695* (2013.01); *H04W 72/046* (2013.01); *H04W 72/085* (2013.01); *H04W 74/006* (2013.01); *H04W 74/0833* (2013.01); *H04W 74/0891* (2013.01); *H04B 7/0617* (2013.01)

(58) Field of Classification Search
CPC .................................... H04B 7/0695
USPC ........................................ 370/329
See application file for complete search history.

(56) References Cited

PUBLICATIONS

XP051209944 R1-1702799 NTT Docomo, Inc., "Views on mechanism to recover from beam failure",3GPP TSG HAN WG1 Meeting #88,Athens, Greece Feb. 13-17, 2017,total 4 pages.
XP051299499 R1-1710283 LG Electronics, "Discussion on beam failure recovery",3GPP TSH HAN WG1 NR Ad-Hoc#2,0ingdao, P.R. China Jun. 27-30, 2017,total 8 pages.
EP 18844912.8-1220—Extended European Search report dated Apr. 14, 2020, 10 pages.

*Primary Examiner* — Joel Ajayi
(74) *Attorney, Agent, or Firm* — Vierra Magen Marcus LLP

(57) ABSTRACT

The disclosure relates to technology for identifying a user equipment beam index in a base station. The base station indicates one or more resources assigned to the user equipment within a beam failure random access channel (BRACH) resource, and transmits one or more synchronization signal block resources and one or more new beam identification reference signal resources to the user equipment. The base station then receives one of the resources from a group of the one or more resources within the BRACH resource assigned to the user equipment corresponding to the BRACH resource, and identifies a preferred beam index of the user equipment based on information in the BRACH resource and the received one of the resources.

34 Claims, 14 Drawing Sheets

APPARATUS AND METHOD FOR BEAM FAILURE RECOVERY

CLAIM FOR PRIORITY

This application claims priority to U.S. Non-Provisional patent application Ser. No. 15/785,834, filed on Oct. 17, 2017, entitled "Apparatus and Method for Beam Failure Recovery", and to provisional patent application Ser. No. 62/543,175, filed on Aug. 9, 2017 and entitled "Apparatus and Method for Beam Failure Recovery", which are incorporated herein by reference as if reproduced in its entirety.

FIELD

The disclosure generally relates to wireless communication networks, and in particular, to recovering from a beam failure between user equipment and a base station.

BACKGROUND

As the demand for capacity in mobile broadband communications increases drastically every year, wireless communication systems are increasing their capability of handling mobile traffic. In next generation systems, such as fifth generation (5G) technologies, advanced communications, such as millimeter-wave (mm-wave) communications, with potential multigigabit-per-second data rates are candidate technologies to increase overall capacity and transmission speeds. Highly directional beamforming antennas are necessary at both the base station (BS) and mobile station (MS) to compensate for the high attenuation in the mm-wave frequency band and to extend its transmission range.

A misalignment between transmitting (Tx) and receiving (Rx) beams may cause a significant loss in the received power, especially for systems with narrow beams, and result in beam failure. To avoid such beam failure, beam alignment in mm-wave communication systems is necessary to find the best beam pair from all possible beam pairs for maximum beamforming efficiency. However, when a beam failure occurs, a reporting and recovery mechanism is employed to report and recover from the failure. During the 3GPP TSG RAN WG1 #89, it was agreed upon to support a non-contention based channel based on the Physical Random Access Channel (PRACH) and the Physical Uplink Control Channel (PUCCH) for beam failure recovery request transmission. PRACH denotes a Long Term Evolution (LTE) uplink channel transmitted by a terminal so as to establish initial synchronization, whereas PUCCH denotes an LTE uplink control channel, and may include Channel Quality Indicator (CQI) information.

BRIEF SUMMARY

According to one aspect of the present disclosure, there is provided a method for identifying a user equipment beam index in a base station, including indicating one or more resources assigned to the user equipment within a beam failure random access channel (BRACH) resource; transmitting one or more synchronization signal (SS) block resources and one or more new beam identification reference signal resources to the user equipment; receiving one of the resources from a group of the one or more resources within the BRACH resource assigned to the user equipment corresponding to the BRACH resource; and identifying a preferred beam index of the user equipment based on information in the BRACH resource and the received one of the resources.

Optionally, in any of the preceding aspects, the method further including assigning the group of the one or more resources to the user equipment within each new beam identification reference signal resources and indicating information on the group to the user equipment, wherein a spatial domain of a transmit beam of each of the SS block resources covers a spatial domain of one or more of the transmit beam of each of the BRACH resources, and a spatial domain of a receive beam of each of the BRACH resources covers a spatial domain of the transmit beam of each of the SS block resources.

Optionally, in any of the preceding aspects, a number of the SS block resources is less than a number of the new beam identification reference signal resources.

Optionally, in any of the preceding aspects, the method further including indicating to the user equipment a mapping between the group of the one or more resources and a number of the one or more new beam identification reference signals for each BRACH resource.

Optionally, in any of the preceding aspects, the one or more resources assigned to the user equipment within the BRACH resource is between one and the number of the new beam identification reference signals within each BRACH resource.

Optionally, in any of the preceding aspects, the method further including setting a direction of a receive beam for each of one or more receive RF-chains in a different direction at the BRACH resource.

Optionally, in any of the preceding aspects, the method further including calculating a received signal quality from each of the one or more receive RF-chain when receiving the one of the resources from a group of the one or more resources; and identifying a user equipment direction based on the receive beam direction of the receive RF-chain that has the highest received signal quality.

Optionally, in any of the preceding aspects, the method further including identifying the user equipment preferred beam index based on the information of the BRACH resource, the user equipment direction and the one of the resources from a group of the one or more resources.

According to one other aspect of the present disclosure, there is provided a device, including a non-transitory memory storage comprising instructions; and one or more processors in communication with the memory, wherein the one or more processors execute the instructions to indicating one or more resources assigned to the user equipment within a beam failure random access channel (BRACH) resource; transmitting one or more synchronization signal block resources and one or more beam failure detection reference signal resources to the user equipment; receiving one of the resources from a group of the one or more resources within the BRACH resource assigned to the user equipment corresponding to the BRACH resource; and identifying a preferred beam index of the user equipment based on information in the BRACH resource and the received one of the resources.

According to still another aspect of the present disclosure, there is provided a non-transitory computer-readable medium storing computer instructions for beam failure recovery in user equipment, that when executed by one or more processors, cause the one or more processors to perform the steps of indicating one or more resources assigned to the user equipment within a beam failure random access channel (BRACH) resource; transmitting one or more synchronization signal block resources and one or more beam failure detection reference signal resources to the user equipment; receiving one of the resources from a group of the one or more resources within the BRACH resource assigned to the user equipment corresponding to the BRACH resource; and identifying a preferred beam index of the user equipment based on information in the BRACH resource and the received one of the resources.

According to yet another aspect of the present disclosure, there is provided a method for identifying a user equipment beam index in a base station, including assigning one or more resources to a new beam identification reference signal index, wherein at least one of the resources is assigned to more than one new identification reference signal index; receiving a beam failure recovery request (BFRR) using one of the one or more resources from user equipment; determining the new beam identification reference signal from the one or more resources used to transmit the BFRR by the user equipment; and sending a beam failure recovery response (BFRP) to the user equipment, wherein the BFRP includes the new beam identification reference signal determined by the base station.

According to still another aspect of the present disclosure, there is provided a method for identifying a beam index, including identifying a new channel state information-reference signal (CSI-RS) beam for beam recovery, wherein the CSI-RS is used as a new beam identification reference signal; sending a beam failure recovery response (BFRR) from user equipment to a base station, wherein the BFRR includes an index of a synchronization signal (SS) block that is spatially quasi co-located with the CSI-RS of the identified new CSI-RS beam; and receiving a beam failure recovery response (BFRP) from the base station, wherein the BFRP includes an index of a CSI-RS that the base station determines as the identified new beam identification reference signal for the user equipment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The disclosure relates to technology for recovering from a beam failure between user equipment and a base station.

User equipment and base stations establish connections using downlink (DL) and uplink (UL) beam pairs. Often times, for example as a result of blockage or user equipment rotation or displacement, the connection between the user equipment and the base station is disrupted, resulting in a beam failure. To overcome such failure, a beam failure recovery mechanism may help to improve high frequency link performance. In particular, a beam failure recovery request (BFRR, or alternatively BFRQ) method based on a PRACH-like (e.g., different parameters for a preamble sequence from PRACH) channel is disclosed in which a UE's new beam index is identified in a BFRR. Accordingly, the system overhead for indicating the new beam index can be significantly reduced when the serving base station (such as a gNB) has multiple radio frequency (RF) chains. In one embodiment, the system overhead for indicating the new beam index may be adaptively adjusted depending on different base station's RF chain configurations.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
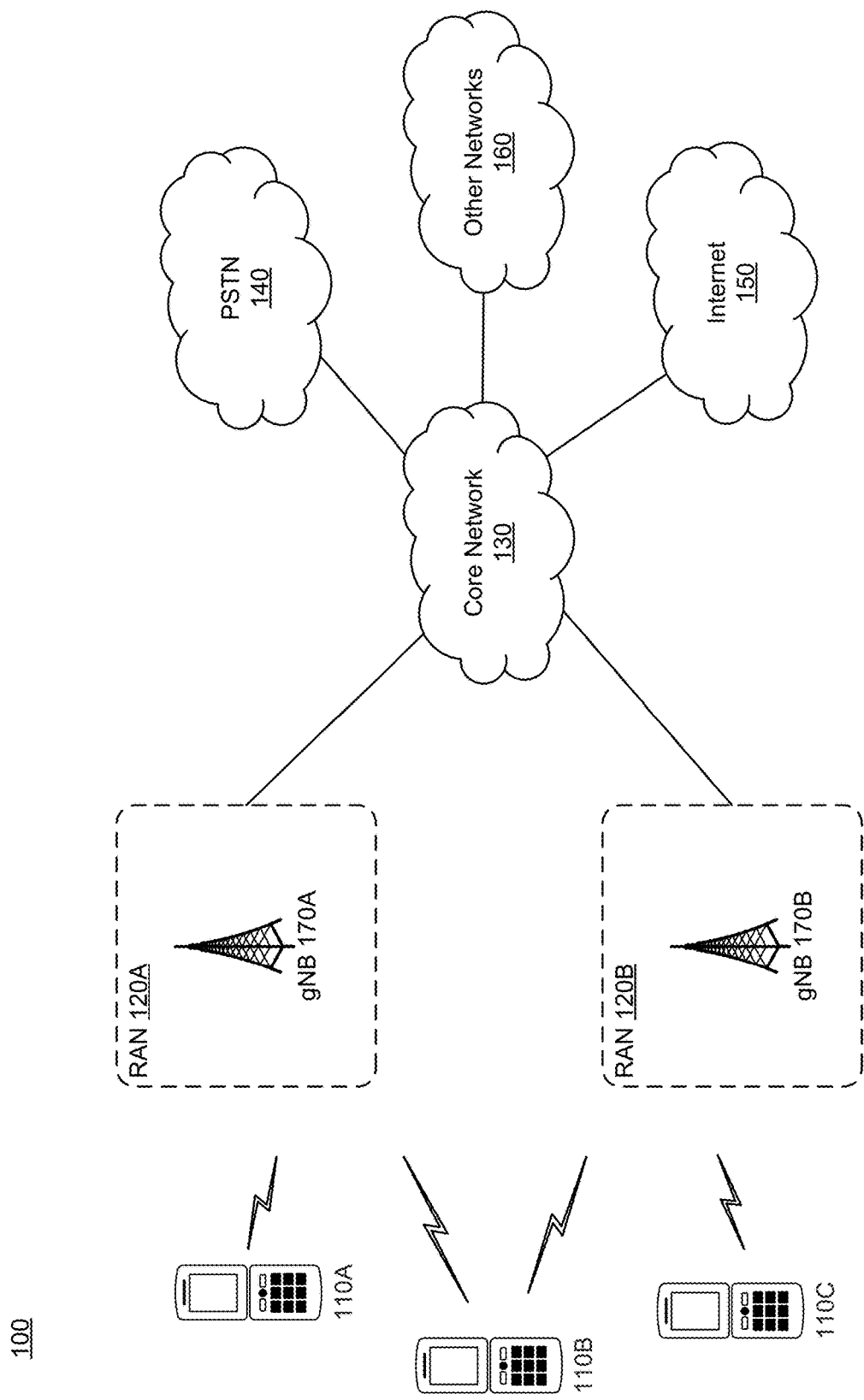
FIG. 1 illustrates a wireless network for communicating data.

FIG. 1 illustrates a wireless network for communicating data. The communication system 100 includes, for example, user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system 100. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

In the depicted embodiment, the RANs 120A-120B include one or more base stations 170A, 170B (collectively, base stations 170), respectively. Each of the base stations 170 is configured to wirelessly interface with one or more of the UEs 110A, 110B, 110C to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the user equipment 110A-110C over one or more air interfaces (not shown) using wireless communication links. The air interfaces may utilize any suitable radio access technology.

It is contemplated that the system 100 may use multiple channel access functionality, including for example schemes in which the base stations 170 and user equipment 110A-110C are configured to implement the Long Term Evolution wireless communication standard (LTE), LTE Advanced (LTE-A), and/or LTE Broadcast (LTE-B). In other embodiments, the base stations 170 and user equipment 110A-110C are configured to implement UMTS, HSPA, or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (a mmW CP) or a base station 170 capable of mmW communication (e.g., a mmW base station). The mmW APs may transmit and receive signals in a frequency range, for example, from 6 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

Figure 2:
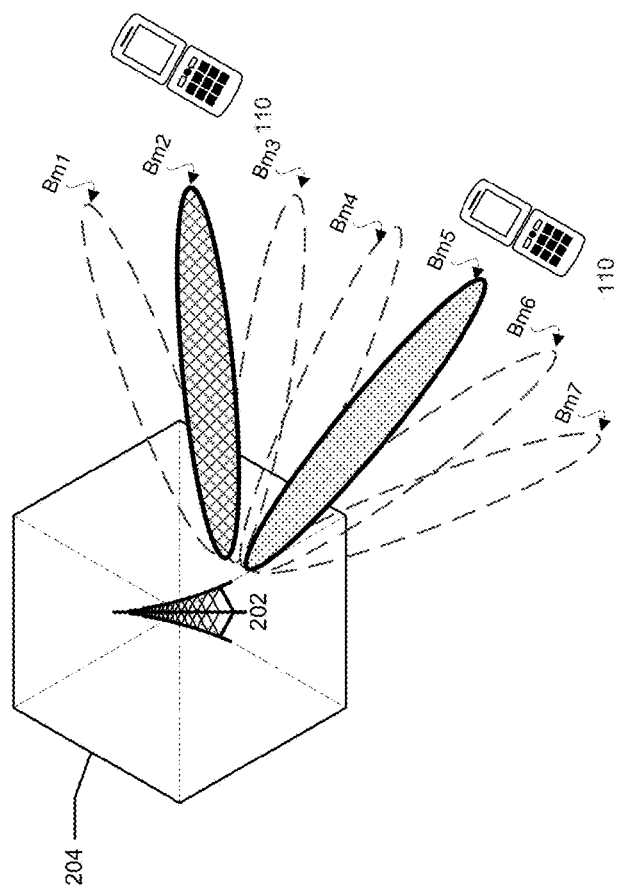
FIG. 2 illustrates a base station with transmitting and receiving beams according to an example embodiment

FIG. 2 illustrates a base station with transmitting and receiving beams according to an example embodiment. The base station 202 manages a cell 204 divided into one or more sectors as its service coverage area and forms multiple transmit/receive (Tx/Rx) beams BM1-BM7 using beamforming schemes, such as digital beamforming (e.g., Transmit (Tx) pre-Inverse Fast Fourier Transform (pre-IFFT) beamforming/Receive (Rx) post-Fast Fourier Transform (post-FFT) beamforming), analog beamforming (e.g., Tx post-IFFT beamforming/Rx pre-FFT beamforming), or a combination thereof. The base station 202 transmits the beamformed signals by sweeping them simultaneously or successively, for example, beginning with beam BM1 and ending with BM7.

User equipment (UE), such as user equipment 110A-110C (FIG. 1), located within the cell of the base station 202 may be configured to receive signals omni-directionally without supporting Rx beamforming, receive signals while supporting Rx beamforming by using one beamforming pattern each time, or receive signals while supporting Rx beamforming by simultaneously using a plurality of beamforming patterns in different directions.

If the user equipment 110A-110C does not support Rx beamforming, the user equipment 110A-110C measures the channel quality of a reference signal (RS) in each transmission beam and reports the measurements to the base station 202. The station 202 selects the best beam for the user equipment 110A-110C from among a plurality of Tx beams. If the user equipment 110A-110C is configured to support Rx beamforming, the user equipment 110A-110C measures the channel qualities of multiple Tx beams received from the base station 202 for each reception beam pattern and reports a total or some high-ranked measurements of all Tx-Rx beam pairs to the base station 202. The base station 202 may allocate an appropriate Tx beam to the user equipment 110A-110C. If the user equipment 110A-110C is capable of receiving a plurality of Tx beams from the base station 202 or supporting a plurality of base station Tx-user equipment Rx beam pairs, the base station 202 may select a beam, taking into account diversity transmission through repeated transmission or simultaneous transmission.

Figure 3:
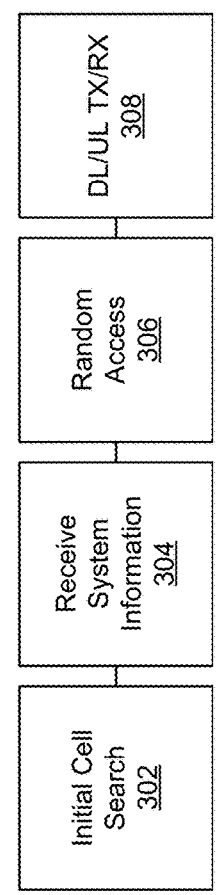
FIG. 3 illustrates physical channels and transmitting signals on the physical channels in accordance with FIG. 2.

FIG. 3 illustrates physical channels and transmitting signals on the physical channels in accordance with FIG. 2. When user equipment 110A-110C (FIG. 1) is powered on or enters a new cell, such as cell 204 (FIG. 2), the user equipment performs an initial cell search 302. The initial cell search 302 involves acquisition of synchronization to a base station, such as gNB 202. Specifically, the user equipment synchronizes its timing to the gNB and acquires a cell Identifier (ID) and other information by receiving a Primary Synchronization Channel (P-SCH) and a Secondary Synchronization Channel (S-SCH) from the gNB 202. Subsequently, the user equipment may acquire information broadcast in the cell by receiving a Physical Broadcast Channel (PBCH) from the gNB 202. During the initial cell search, the user equipment may monitor a downlink (DL) channel state by receiving a downlink reference Signal (DL RS).

After the initial cell search, the user equipment 110A-110C may acquire detailed system information at 304 by receiving a Physical Downlink Control Channel (PDCCH) and receiving a Physical Downlink Shared Channel (PDSCH) based on information included in the PDCCH.

If the user equipment 110A-110C initially accesses the gNB 202 or has no radio resources for signal transmission to the gNB 202, the user equipment 110A-110C may perform a random access procedure at 306 with the gNB 202. During the random access procedure 306.

Upon completion of the above process, the user equipment 110A-110C may receive a PDCCH and/or a PDSCH from the gNB 202 and transmit a Physical Uplink Shared Channel (PUSCH) and/or a PUCCH to the gNB 202, which is a general DL and UL signal transmission procedure at 308. Specifically, the user equipment 110A-110C receives Downlink Control Information (DCI) on a PDCCH. The DCI includes, for example, control information such as resource allocation information for the user equipment 110A-110C.

Control information that the user equipment 110A-110C transmits to the gNB 202 on the uplink (UL) channel or receives from the gNB 202 on the DL channel includes a DL/UL ACKnowledgment/Negative ACKnowledgment (ACK/NACK) signal, a Channel Quality Indicator (CQI), a Precoding Matrix Index (PMI), a Rank Indicator (RI), etc. The control information, such as a CQI, a PMI, an RI, etc., may be transmitted on a PUSCH and/or a PUCCH.

Figure 4:
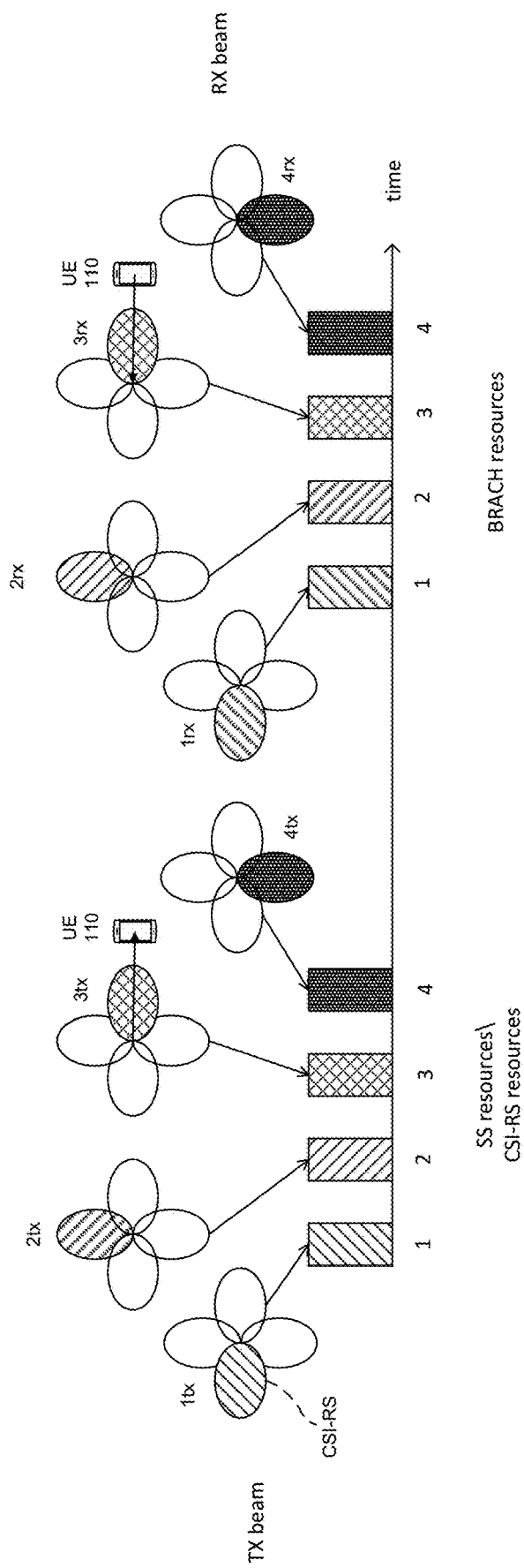
FIG. 4 illustrates an example of identifying a new beam when a beam failure is detected.

FIG. 4 illustrates an example of identifying a new beam when a beam failure is detected. As illustrated, a gNB has transmit beams 1tx-4tx aligned with reference signal resources 1-4 and receive beams 1rx-4rx aligned with beam failure random access control channel (BRACH) resources 1-4. As used herein, a BRACH denotes a non-contention based channel that is based on a physical random access channel (PRACH)-like (that is, the physical layer channel structure for beam failure report may be different from PRACH) for a beam failure report (the resources for a beam failure are non-contention based—i.e., dedicated).

The UE 110 is responsible for regularly and periodically monitoring reference signals RSs for beam failure detection to determine whether a beam failure has been detected. For example, the UE 110 measures reception quality of the reference signals RSs for beam failure detection, in this case the reference signals for beam failure detection are the Channel State Information-Reference Signals (CSI-RSs), transmitted from the respective antenna ports in the base stations. It is appreciated that the reference signal for beam failure detection transmitted in a beam is not limited to the CSI-RS and may be a PSS (Primary Synchronization Signal), a SSS (Secondary Synchronization Signal), an Enhanced SS, a Discovery signal, a DM-RS (Data Demodulation-Reference Signal) or the like.

In one other embodiment, a synchronization signal (SS)-block within the serving cell may be monitored to determine whether a beam failure has been detected.

Once a beam failure has been detected by the UE 110, a new candidate beam is identified by the UE 110 by monitoring the reference signal for new beam identification and selecting a beam 1tx-4tx having good reception quality based on the measured reception quality. In one embodiment, the reference signal for new beam identification is a CSI-RS. In another embodiment, the reference signal for new beam identification is a SS block. In one other embodiment, beam identification includes the UE 110 monitoring each of the beam resources (periodic CSI-RS). In another embodiment, beam identification includes the UE 110 monitoring the beam resources (periodic CSI-RS) and SS resources (blocks) within the serving cell (not shown).

Once the UE 110 has detected a beam failure and selected the new candidate beam, the UE 110 sends a beam failure recovery request (BFRR) transmission to the base station (such as gNB 202). To send the BFRR, the gNB may configure each UE 110 with unique BRACH preamble(s) within a BRACH region before the UE 110 transmits the BFRR. That is, the gNB may schedule a channel to report beam failure (i.e. the BRACH) and inform the UE 110. Scheduling a BRACH by the gNB 202 is discussed further below.

The UE 110, in the case of a beam recovery, may then use the BRACH preamble(s) to send the BFRR. In one embodiment, the gNB may send out multiple SSs in a one or more resources with different beamforming of SSs on different resources. That is, the gNB 202 may send out multiple resources using different beams within different time frames, as depicted in FIG. 4.

In another embodiment, the gNB 202 may schedule multiple BRACH resources in the time domain. Thus, the gNB 202 may signal a fixed relationship between a BRACH resource and an SS resource. For example, each of the SS resources (SS resources 1-4) have a corresponding Rx beamforming of each of the BRACH resources (BRACH resources 1-4), such that a one-to-one association exists (e.g., with reference to the figure, the Tx beam of SS 1 resource holds a beam correspondence relationship with the Rx beam of the BRACH resource 1).

In the depicted example, and for purposes of discussion, SS resources are used as reference signals for new beam identification, and there are four (4) SS resources and four (4) BRACH resources, where each of the Tx beams 1tx-4tx for the SS resources and each of Rx beams 1rx-4rx for the BRACH resources 1-4 respectively hold beam correspondence. It is understood that the disclosed embodiment is non-limiting and that any number of configurations of UEs, base stations, Tx beams, Rx beams, SS resources, CSI-RS resources and BRACH resources may be employed.

In the example, when a UE 110 measures the SS resources 1-4, the UE 110 identifies the SS resource 3 as having the highest received signal quality. (The received signal quality can be measured in various ways such as reference signal received power (RSRP) (RSRP may be measured using conventional techniques), or signal-to-noise ratio of the received reference signal). Subsequently, when the UE 110 transmits previously assigned BRACH preambles (as scheduled by the gNB 202) to all BRACH resources 1-4, the gNB 202 receives the preamble with the highest received power on BRACH resource 3, which was identified by UE 110 as having the highest RSRP. In another example, the UE 110 transmits a previously assigned BRACH preamble to the BRACH resource corresponding to the SS resource that the UE 110 has identified as having the highest received signal quality. In this case, the gNB 202 receives the BRACH preamble from UE 110 only on BRACH resource 3.

Figure 7:
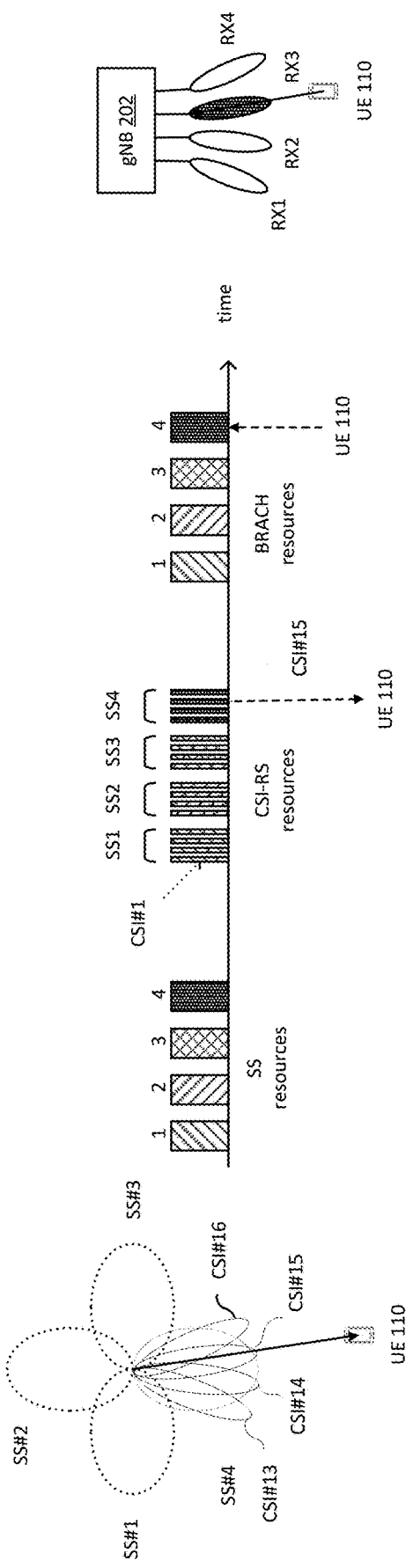
FIG. 7 illustrates another example of a reference signal beam mapped to a synchronization signal beam.

However, while the gNB is able to determine a new beam identification using the SS resource (e.g., SS resource 1-4), the gNB 202 is not able to detect a new beam identification using a CSI-RS resource. The CSI-RS resources are not detectable by the gNB 202 since the CSI-RS resources are narrower than the SS resources (FIG. 7 illustrates an example of the narrower CSI-RS resources within an SS resource, where each SS resource is composed of 4 CSI-RS resources) in most operation scenarios. Nevertheless, each BRACH resource maintains beam correspondence with each SS resource. Thus, when a UE 110 finds a new beam using a CSI-RS resource, the UE 110 will send a BRACH resource that corresponds to the SS resource in which the CSI-RS is located. Based on the BRACH resource sent to the gNB 202 by the UE 110, a corresponding BRACH preamble is received by the gNB 202, thereby enabling the gNB 202 to identify the SS resource corresponding to the CSI-RS resource. However, the gNB 202 cannot identify the specific CSI-RS resource within the SS resource without additional information. Thus, additional information about the UE's 110 new beam will need to be transmitted, which requires additional system overhead.

Figure 5A:
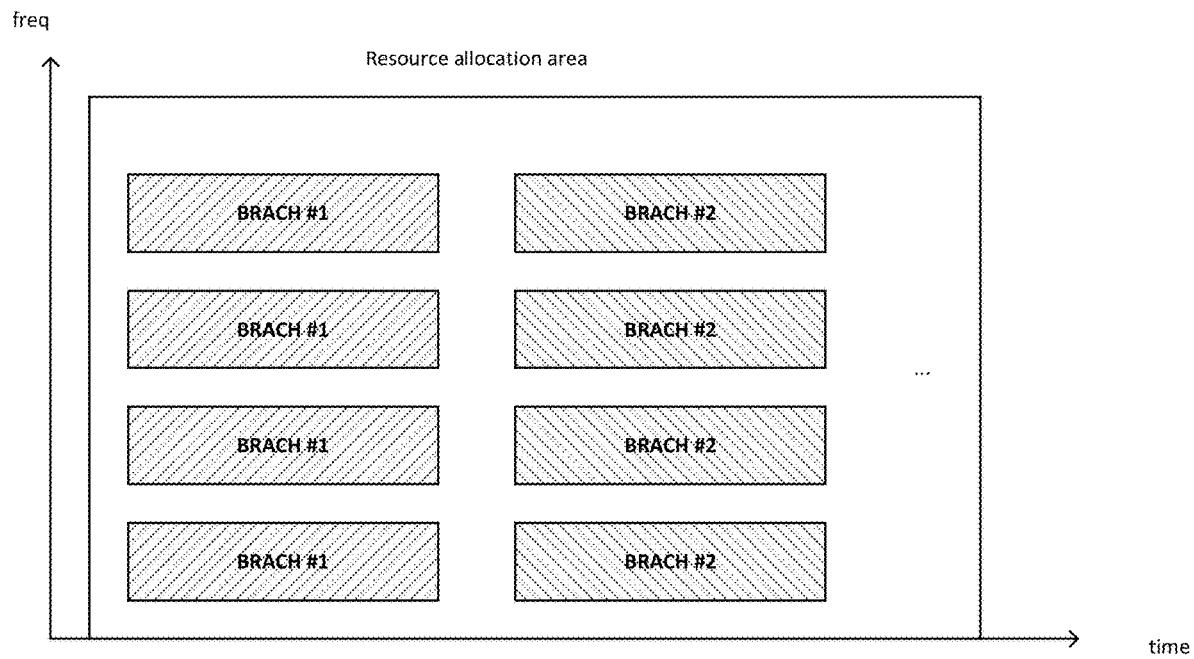
FIGS. 5A and 5B illustrate assignment of unique resources for user equipment within a BRACH resource.
Figure 5B:
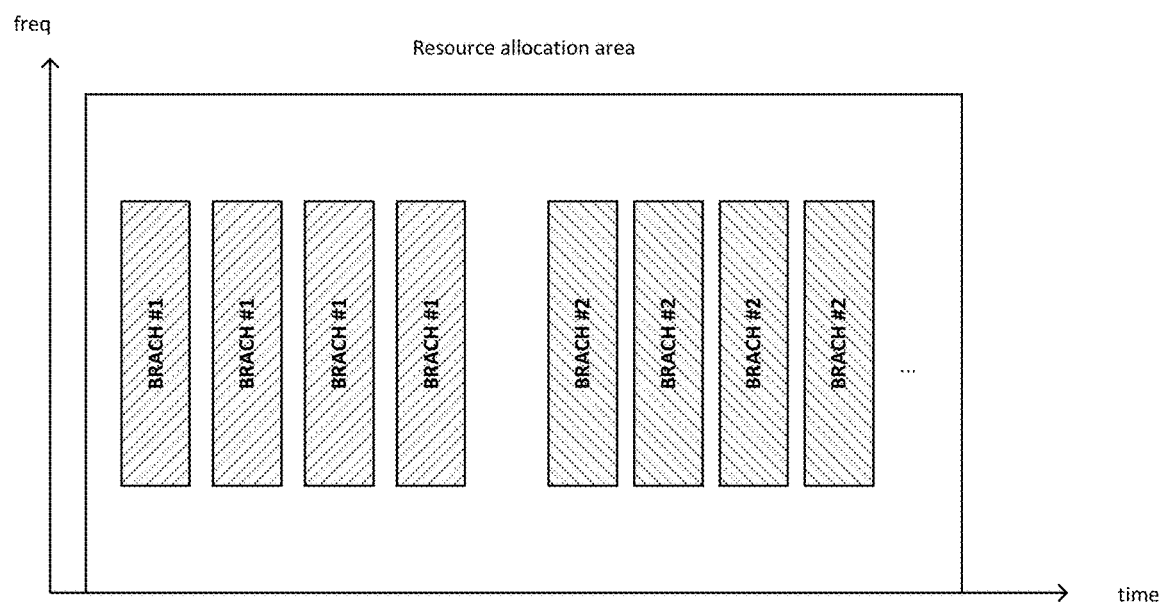

FIGS. 5A and 5B illustrate assignment of unique resources for user equipment within a BRACH resource. For purposes of discussion, several factors are assumed. Prior to the BFRR sent by the UE 110, the gNB 202 first informs the UE 110 assignment of unique resources corresponding to the UE ID and the new candidate beam index (NBI) (i.e., the candidate beam or new beam). That is, the BFRR includes the ID of the UE 110 and the NBI identified by the UE 110. In one embodiment, the UE 110 may not select a preferred beam, which is not discussed as part of this disclosure; a gNB 202 may (or may not) have multiple RF-chains; beam correspondence exists for both the gNB 202 and UE 110. Thus, the gNB 202 and UE 110 can identify the transmit beam based on the receive beam, and gNB 202 and UE 110 can identify the receive beam based on the transmit beam; CSI-RS is used as the RS for beam failure detection and as the RS for new beam identification; and the number of beams for the SS resource blocks may be equal to or smaller than the number of beams for CSI-RS. For example, a single SS beam is composed of K CSI-RS beams, where K is the number of CSI-RS beams in a single SS beam and (K>=1).

With reference to the figures, FIG. 5A illustrates the assignment of unique resources in Frequency Division Multiplexing (FDM), and FIG. 5B illustrates the assignment of unique resources in Time Division Multiplexing (TDM). For purposes of discussion, in the following example, there are 4 CSI-RS beams in each SS beam: C1, C2, C3, and C4.

In one embodiment, when a gNB 202 assigns unique resource(s) for a UE 110 within a BRACH resource, the different resources can be, for example, a different BRACH preamble, unique BRACH preamble assigned in different time TDM (FIG. 5B), unique BRACH preamble assigned in different frequency resource FDM (FIG. 5A), or a combination of above cases. As illustrated in the figures, each BRACH preamble depicted is a resource. For example, in FIG. 5A, the first column of BRACH #1 has four resources, each represented by an individual BRACH block.

In one other embodiment, the gNB 202 assigns SS resources to the UE 110 such that one assigned SS resource corresponds to more than one CSI-RS beam.

In another embodiment, there are four CSI-RS beams (C1, C2, C3 and C4) within a BRACH resource, and the gNB 202 only assigns two resources (as opposed to 4) for a UE 110 within a BRACH resource. We term these two resources R1 and R2, which is indicated to the UE 110 by the gNB 202, where R1 represents C1 and C2 and R2 represents C3 and C4 (In one embodiment, this information can be implicitly indicated by predetermined manner). Thus, if the UE 110 identifies a preferred beam as C1 or C2, then R1 is selected, and if the UE 110 identifies a preferred beam as C3 or C4, then R2 is selected. Use of the two resources (R1 and R2), as opposed to 4 resources (C1-C4), provides a 50% reduction in the number of resources.

In another embodiment, a gNB 202 assigns a resource for more than one new beam identification RS index for beam failure recovery. When a beam failure happens for a UE 110, and the UE 110 identifies a new beam, the UE 110 transmits a BFRR on a resource that corresponds to the identified new beam (new beam identification RS index), where the resource represents more than one new beam identification RS index. After receiving the BFRR on the resource sent from the UE 110 at the BRACH resource, the gNB 202 determines which new beam identification RS index is used from the UE 110, and the gNB 202 sends back a beam failure recovery response (BFRP) to the UE, wherein the BFRP comprises the new beam identification RS index that the gNB determined.

In another embodiment, when a beam failure happens for a UE 110, the CSI-RS is used as a new beam identification RS, and the UE 110 identifies a new CSI-RS beam for beam recovery. Then, the UE 110 transmits aBFRR on a resource that corresponds to SS beam that is QCL'ed with the identified new CSI-RS beam for beam recovery (the SS beam that covers the identified new CSI-RS beam). After receiving the BFRR on the resource sent from the UE 110 at the BRACH resource, the gNB 202 determines which new beam identification RS index is used from the UE 110, and the gNB 202 sends back a BFRP to the UE 110, where the BFRP includes the new beam identification RS index (CSI-RS index) that the gNB 202 determines.

In one further embodiment, the gNB 202 has a multiple number of RF chains (received paths the gNB may identify). Where multiple RF chains exist, the gNB 202 can search for multiple hypotheses (BRACH preambles) for the UE's 110 new candidate beam index in parallel for each resource assigned for the UE 110. This is described, for example, with reference to FIG. 7 (discussed in more detail below), in which the UE 110 is assigned one BRACH preamble and the gNB 202 has different RF chains that check different beam directions RX1-RX4 (which are matched to each of the CSI-RS beams), the gNB 202 can determine which of the CSI-RS beams (indicated by CSI #13-CSI #16) from the UE 110 is the new candidate beam. Applying this technique, the UE 110 occupies only one BRACH preamble, even where the gNB 202 has more than one RF chain. In this manner, the size of the index indicating the UE's new candidate beam can be reduced (explained in the example below).

In one embodiment, the gNB 202 is responsible for indicating the number of resources assigned to a UE 110 within a BRACH resource (N_R), as well as a mapping to the group of one or more CSI-RSs within the BRACH resource. Examples of mappings between N_R resources and the index of corresponding CSI-RS resources for (K, N_R) is detailed below with reference to Table 1 and the equations that follow.

TABLE 1

(K, N_R) = (4, 2)

$1^{st}$ resource corresponds to $1^{st}$ and $3^{rd}$ beam failure detection RS beam within the BRACH resource
$2^{nd}$ resource corresponds to $2^{nd}$ and $4^{th}$ beam failure detection RS beam within the BRACH resource (K, N_R) = (3, 2)

$1^{st}$ resource corresponds to $1^{st}$ and $3^{rd}$ beam failure detection RS beam within the BRACH resource
$2^{nd}$ resource corresponds to $2^{nd}$ beam failure detection RS beam within the BRACH resource (K, N_R) = (8, 2)

$1^{st}$ resource corresponds to $1^{st}$, $3^{rd}$, $5^{th}$, and $7^{th}$ beam failure detection RS beam within the BRACH resource
$2^{nd}$ resource corresponds to $2^{nd}$, $4^{th}$, $6^{th}$, and $8^{th}$ beam failure detection RS beam within the BRACH resource (K, N_R) = (8, 3)

$1^{st}$ resource corresponds to $1^{st}$, $4^{th}$, and $7^{th}$ beam failure detection RS beam within the BRACH resource
$2^{nd}$ resource corresponds to $2^{nd}$, $5^{th}$, and $8^{th}$ beam failure detection RS beam within the BRACH resource
$3^{rd}$ resource corresponds to $3^{rd}$ and $6^{th}$ beam failure detection RS beam within the BRACH resource (K, N_R) = (8, 4)

$1^{st}$ resource corresponds to $1^{st}$ and $5^{th}$ beam failure detection RS beam within the BRACH resource
$2^{nd}$ resource corresponds to $2^{nd}$ and $6^{th}$ beam failure detection RS beam within the BRACH resource
$3^{rd}$ resource corresponds to $3^{rd}$ and $7^{th}$ beam failure detection RS beam within the BRACH resource
$4^{th}$ resource corresponds to $4^{th}$ and $8^{th}$ beam failure detection RS beam within the BRACH resource In one embodiment, for given (K, N_R) pair, k-th beam failure detection RS beam within the BRACH resource is mapped to (mod(k, N_R))-th resource to the UE, where $0 \leq k \leq K-1$ and BRACH resource index [0, N_R−1].

In another embodiment, for given (K, N_R) pair, k-th beam failure detection RS beam within the BRACH resource is mapped to (mod(k−1, N_R)+1)-th resource to the UE, where $1 \leq k \leq K$ and BRACH resource index [1, N_R].

In still another embodiment, for given (K, N_R) pair, k-th beam failure detection RS beam within the BRACH resource is mapped to (mod(k−1, N_R))-th resource to the UE, where $1 \leq k \leq K$ and BRACH resource index [0, N_R−1].

Figure 6:
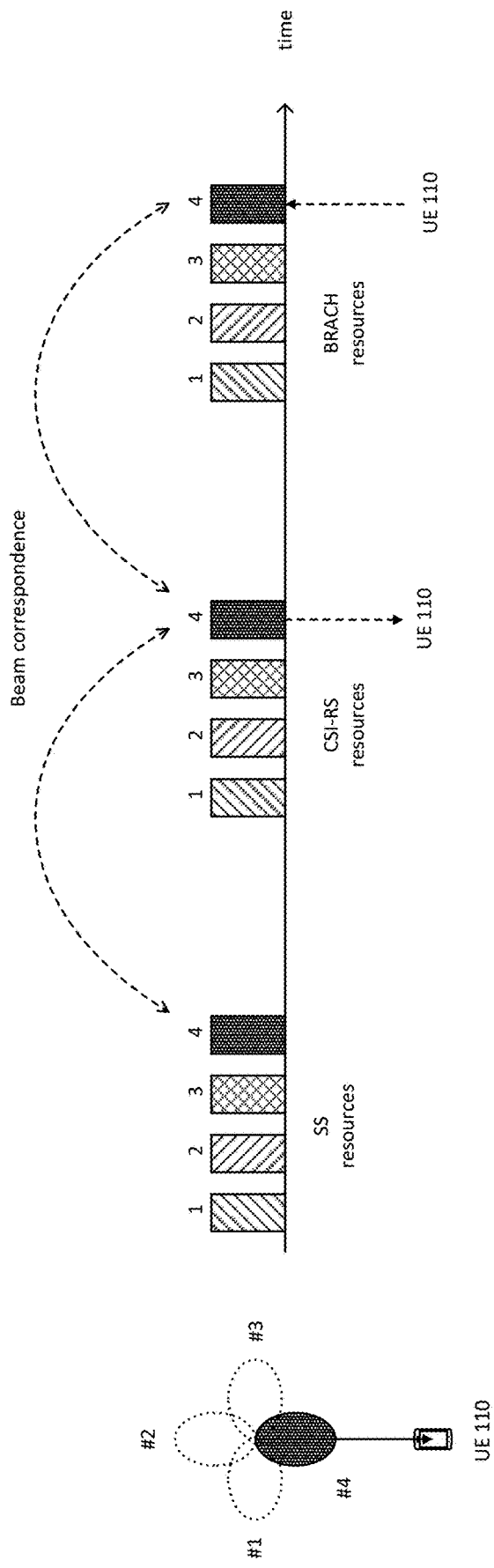
FIG. 6 illustrates an example of a reference signal beam mapped to a synchronization signal beam.

FIG. 6 illustrates an example of a reference signal beam mapped to a synchronization signal beam. In this example, K=1 (we recall from above that K is the number of RS beams in a single SS beam), and the RS beam is a CSI-RS beam mapped to each SS beam. Accordingly, in the example, the number of resources assigned for a UE within a BRACH resource (N_R) is equal to 1.

For purposes of discussion, the non-limiting operational example illustrated in FIG. 6 shows an SS block with four SS resources #1-#4 and a corresponding number of resources assigned to reference signals CSI-RS (CSI-RS resources #1-#4). Prior to beam failures, the base station (gNB) 202 indicates the number of resources (N_R=1) assigned to the UE 110, and the gNB 202 assigns and indicates a BRACH preamble to UE 110. The gNB 202 also transmits beamforming for the $i^{th}$ SS block resource and the $i^{th}$ CSI-RS resource, and receives beamforming from the UE 110 for $i^{th}$ BRACH resource having beam correspondence ($1 \leq i \leq 4$). For example, the gNB 202 transmit beamforming for the $4^{th}$ SS block resource and the $4^{th}$ CSI-RS resource, and receives beamforming form the UE 110 for the $4^{th}$ BRACH resources having the same spatial filtering (beam correspondence).

When a beam failure occurs, the UE 110 identifies the beam failure and measures the signal quality of each resource of RS for new beam identification (CSI-RS in this example), and transmits a BFRR to the gNB 202. In this example, the UE 110 identifies that the signal quality of resource #4 is the best among the candidate resources of CSI-RS (i.e., of the 4 CSI-RS resources #1-#4, the UE 110 determines that CSI-RS resource #4 is the best new candidate for beam transmission), and transmits a BRACH preamble for CSI-RS resource #4 (previously assigned by the gNB) to BRACH resource #4. The gNB 202 receives the BRACH preamble sent by UE 110 at the BRACH resource #4 and recognizes that UE 110 sent the BFRR to the gNB with the UE's 110 preferred beam being indicated as the beam corresponding to CSI-RS #4.

Figure 9:
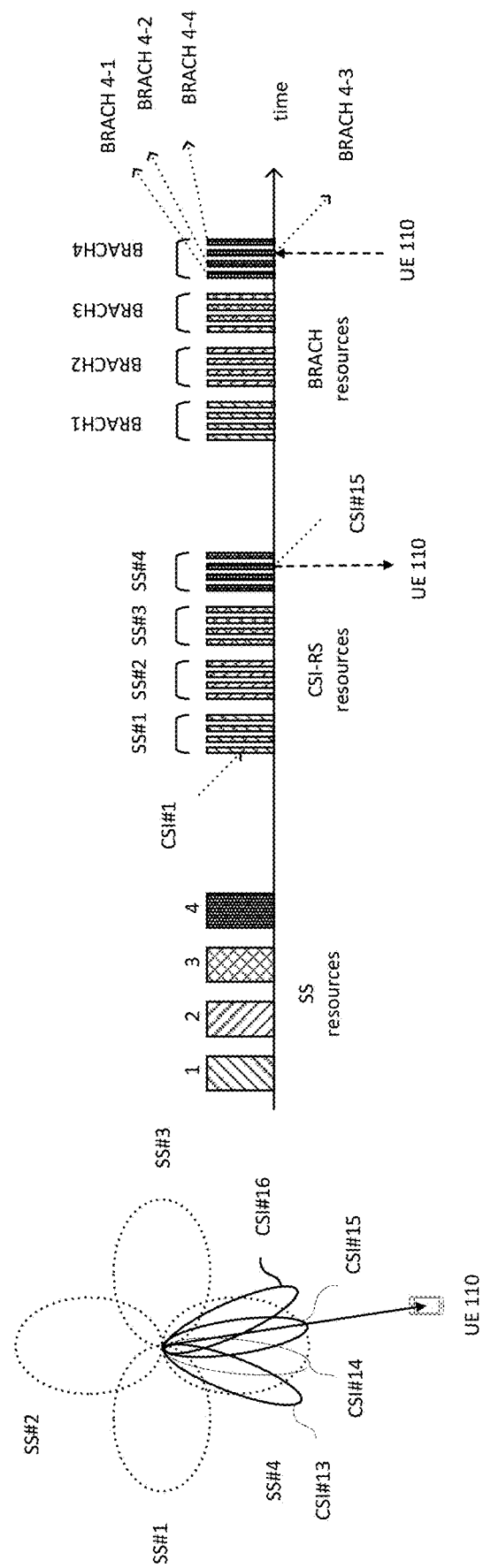
FIG. 9 illustrates another example of a reference signal beam mapped to a synchronization signal beam.

FIG. 7 illustrates another example of a reference signal beam mapped to a synchronization signal beam. In this example, a single SS beam area may cover multiple CSI-RS beam areas (i.e., K>1). For example, as depicted, SS beam #4 covers CSI-RS beams CSI #13-CSI #16. In one embodiment, this is accomplished by the gNB 202 indicating the number of resources (i.e., BRACH sub-resources BRACH 4-1 to BRACH 4-4, as depicted in FIG. 9) assigned for the UE 110 within a BRACH resource (N_R) and a respective mapping to the group CSI-RSs within the BRACH resource, where $1 \leq N\_R \leq K$.

If a UE's preferred (candidate) beam is any of the CSI-RS beams (e.g., CSI #13-CSI #16) covered by a SS beam (e.g., SS #4), the UE 110 may send a resource that is mapped to the CSI-RS corresponding to the UE's preferred beam within the BRACH resource that holds beam correspondence with the SS beam. In one embodiment, the mapping between the resource and the group of CSI-RSs within the BRACH resource can be explicitly indicated by the gNB 202, and may also be predetermined without an explicit indication.

In the example illustrated in FIG. 7, the gNB 202 has four resources for SS blocks (SS #1-SS #4) and sixteen resources for CSI-RS (CSI #1-CSI #16) assigned, where each SS beam (SS #1-SS #4) is composed of four CSI-RS beams (K=4). For example, SS #4 has four CSI-RS beams CSI #13-CSI #16.

The gNB transmit beam for the $i^{th}$ SS block resource covers the transmit beam for $(4(-1)+1)^{th}$, $(4(i-1)+2)^{th}$, $(4(i-1)+3)^{th}$, and $(4(i-1)+4)^{th}$ CSI-RS resource. For example, the transmit beams for SS #1, SS #2, SS #3 and SS #4 respectively cover CSI-RS #1-4, 5-8, 9-12 and 13-16.

As depicted, the gNB 202 has four RX antenna chains (RX1-RX4). The gNB 202 also indicates N_R=1 to UE 110 prior to beam failure, and assigns and indicates a BRACH preamble to UE 110, as explained above with reference to FIG. 6. If a UE's preferred (candidate) beam is any of the CSI-RS beams covered by an SS beam, the UE 110 sends the BRACH preamble (as previously assigned by the gNB) within the BRACH resource that covers the CSI-RS beam to the gNB 202.

As the gNB 202 has four RX antenna chains, the receive beam of each antenna chain is directed to each CSI-RS beam within the BRACH resource. For example, the receive beam for RX1, RX2, RX3 and RX4 has the same spatial filtering with the transmit beam of CSI #13, CSI #14, CSI #15 and CSI #16. When the UE 110 identifies that beam failure has occurred, the UE 110 measures signal quality of each resource of RS for new beam identification (CSI-RS in this example), as explained above.

In the example the follows, and after beam failure has been detected, the UE 110 identifies that the signal quality of CSI-RS #15 is the best among the candidate resources of CSI-RS. For example, the UE 110 determines that the signal quality of CSI-RS #15 is the best based on the measured RSRP. As CSI-RS #15 corresponds to BRACH resource #4, the UE 110 transmits the BRACH preamble assigned by the gNB 202 at BRACH resource #4.

At each BRACH resource, the gNB's antenna chains RX1-RX4 receive the transmitted BRACH preamble from the UE 110 and determine whether the BRACH preamble is detected and matches any of the CSI-RS beams CSI #13-CSI #16 previously assigned by the gNB 202. Since the UE is in the area of CSI #15, the gNB's antenna chain RX3 detects the BRACH preamble, determines that UE 110 sent a BFRR to the gNB along with the UE 110 preferred beam that corresponds to CSI-RS #15 and receives the transmission on BRACH resource #4.

Figure 8:
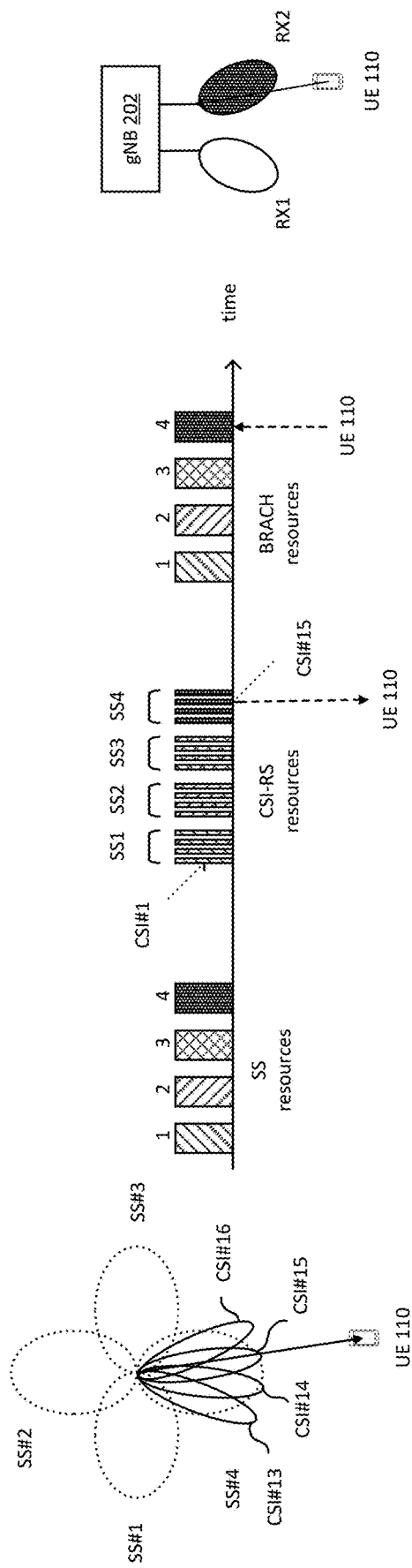
FIG. 8 illustrates another example of a reference signal beam mapped to a synchronization signal beam.

FIG. 8 illustrates another example of a reference signal beam mapped to a synchronization signal beam. In this example, a single SS beam area may cover multiple CSI-RS beam areas (i.e., K>1), similar to FIG. 7.

In the example embodiment, the gNB 202 has four resources for SS blocks (SS #1-SS #4) and sixteen resources for CSI-RS (CSI #1-CSI #16) assigned, where each SS beam is composed of four CSI-RS beams (K=4), and the gNB 202 transmit beam for the $i^{th}$ SS block resource covers the transmit beam for the $(4(i-1)+1)^{th}$, $(4(i-1)+2)^{th}$, $(4(i-1)+3)^{th}$, and $(4(i-1)+4)^{th}$ CSI-RS resource, similar to the embodiment in FIG. 7.

However, in the embodiment of FIG. 8, the gNB 202 has two RX antenna chains RX1 and RX2 (as opposed to four antenna chains). The gNB 202 therefore indicates N_R=2 to UE 110 prior to beam failure, and assigns and indicates two BRACH preambles (seq1, seq2) to UE 110.

In addition to the information provided above, the following mapping between each BRACH preamble and corresponding CSI-RS resource is known to the UE 110 before beam failure occurs either by the gNB 202 explicit indication or via a predetermined rule without explicit indication: (1) seq1 for CSI-RS resource $(4(i-1)+1)^{th}$ and $(4(i-1)+3)^{th}$, and seq2 for CSI-RS resource $(4(i-1)+2)^{th}$ and $(4(i-1)+4)^{th}$, (2) if a UE's preferred beam is any of the CSI-RS beams that is covered by an SS beam, the UE 110 sends a corresponding BRACH preamble (seq1 or seq2) within the BRACH resource that covers the CSI-RS beam, and (3) the transmit beamforming at the gNB 202 for $i^{th}$ SS block resource and the receive beamforming at the gNB 202 for i-th BRACH resource hold beam correspondence (1≤i≤4).

Another example of mapping for the gNB 202 to directly indicate the mapping as shown in Table 2 below:

TABLE 2

| CSI# | BRACH resource | BRACH preamble |
|---|---|---|
| 1 | 1 | seq1 |
| 2 | 1 | seq2 |
| 3 | 1 | seq1 |
| 4 | 1 | seq2 |
| 5 | 2 | seq1 |
| 6 | 2 | seq2 |
| 7 | 2 | seq1 |
| 8 | 2 | seq2 |
| 9 | 3 | seq1 |
| 10 | 3 | seq2 |
| 11 | 3 | seq1 |
| 12 | 3 | seq2 |
| 13 | 4 | seq1 |
| 14 | 4 | seq2 |
| 15 | 4 | seq1 |
| 16 | 4 | seq2 |

In the example of Table 2, the gNB 202 indicates mapping between each CSI-RS to (BRACH resource, BRACH preamble) without indicating the SS index, and the same BRACH resource and BRACH preamble can be assigned to multiple CSI # s.

As in the prior examples, when the UE 110 identifies a beam failure, the UE 110 measures the signal quality of each resource (i.e., the RS for new beam identification, in this case CSI-RS). The UE 110 identifies that the signal quality of CSI-RS #15 is the best among the candidate resources of CSI-RS. Since CSI-RS #15 corresponds to BRACH #4 and BRACH preamble (seq1), the UE 110 transmits the corresponding BRACH preamble (seq1) at BRACH resource #4, as described above.

At each BRACH resource (BRACH resource #1-#4), the gNB's antenna chain RX1 covers the $(4(i-1)+1)^{th}$ and $(4(i-1)+2)^{th}$ CSI-RS beam and antenna chain RX2 covers the $(4(i-1)+3)^{th}$ and $(4(i-1)+4)^{th}$ CSI-RS beams. Thus, the gNB 202 antenna chain RX1 checks for BRACH preamble reception for the $(4(i-1)+1)^{th}$ and $(4(i-1)+2)^{th}$ CSI-RS resources, and the gNB 202 antenna chain RX2 checks for BRACH preamble reception for the $(4(i-1)+3)^{th}$ and $(4(i-1)+4)^{th}$ CSI-RS resources.

Following the example, at BRACH resource #4, as the UE 110 is in the area of CSI #15, the gNB 202 antenna chain RX2 detects the BRACH preamble (seq1). As gNB 202 antenna chain RX2 covers CSI #15 and CSI #16 resources and the detected BRACH preamble (seq1) is assigned to the UE's CSI #13 and CSI #15 resources, only CSI-RS #15 satisfies both conditions. Therefore, upon receipt, the gNB 202 determines that the UE 110 sent a BFRR to the gNB 202 and which includes the UE's preferred beam that corresponds to CSI-RS #15.

FIG. 9 illustrates another example of a reference signal beam mapped to a synchronization signal beam. In this example, a single SS beam area may cover multiple CSI-RS beam areas (i.e., K>1), similar to FIGS. 7 and 8.

In the example embodiment, the gNB 202 has four resources for SS blocks (SS #1-SS #4) and sixteen resources for CSI-RS (CSI #1-CSI #16) assigned, where each SS beam is composed of four CSI-RS beams (K=4), and the gNB 202 transmit beam for the $i^{th}$ SS block resource covers the transmit beam for the $(4(i-1)+1)^{th}$, $(4(i-1)+2)^{th}$, $(4(i-1)+3)^{th}$, and $(4(i-1)+4)^{th}$ CSI-RS resource, similar to the embodiments in FIGS. 7 and 8.

However, in the embodiment of FIG. 9, the gNB has 1 RX antenna chain (not shown), and assigns and indicates BRACH preamble(s) to UE 110. In the example, the gNB 202 indicates N_R=4 to UE 110 prior to beam failure.

In one embodiment, each BRACH resource is composed of four BRACH sub-resources 4-1, 4-2, 4-3 and 4-4, where each $j^{th}$ BRACH sub-resource is mapped to the $(4(i-1)+j)^{th}$ CSI-RS resource. If a UE's preferred beam is any of the CSI-RS beams (CSI-RS #13-CSI-RS #16) that is covered by an SS beam (SS #1-SS #4), the UE 110 sends a corresponding BRACH preamble at the corresponding BRACH sub-resource (the BRACH sub-resource can use different frequency resources or time resources. In this example, different time resources are used) within the BRACH resource that holds beam correspondence with the SS beam.

Transmit beamforming for the $i^{th}$ SS block resource and receive beamforming for the $i^{th}$ BRACH resource from the gNB 202 hold beam correspondence (where $1 \leq i \leq 4$). When the UE 110 identifies a beam failure, the UE 110 measures the signal quality (e.g., RSRP) of each resource (i.e., the RS for new beam identification, in this case CSI-RS).

The UE 110 identifies that the signal quality of CSI-RS #15 is the best among the candidate resources of CSI-RS. Since the CSI-RS #15 corresponds to BRACH #4 and BRACH sub-resource #3, the UE 110 transmits the BRACH preamble at the BRACH sub-resource #3 of BRACH resource #4. The gNB 202 then receives the BRACH preamble assigned to UE 110 at the BRACH sub-resource #3 of BRACH resource #4, and recognizes that UE 110 sent a BFRR to the gNB 202, which included the UE's preferred beam corresponding to CSI-RS #15.

Figure 10:
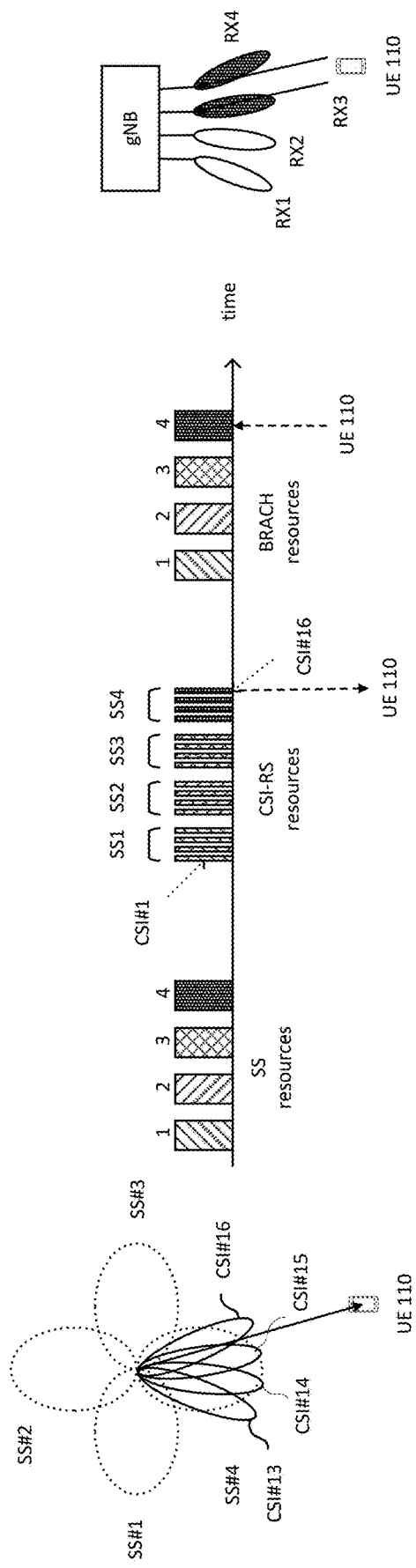
FIG. 10 illustrates another example of a reference signal beam mapped to a synchronization signal beam.

FIG. 10 illustrates another example of a reference signal beam mapped to a synchronization signal beam. Similar to the above examples, a single SS beam area may cover multiple CSI-RS beam areas (i.e., K>1). However, unlike the prior examples in which the UE 110 is covered by a single CSI-RS beam, here the UE 110 is located in a coverage area between two beams (CSI #15 and #16).

The gNB 202 has four resources for SS blocks (SS #1-SS #4) and sixteen resources for CSI-RS (CSI #1-CSI #16) assigned, where each SS beam is composed of four CSI-RS beams (K=4), and the gNB 202 transmit beam for the $i^{th}$ SS block resource covers the transmit beam for the $(4(i-1)+1)^{th}$, $(4(i-1)+2)^{th}$ $(4(i-1)+3)^{th}$, and $(4(i-1)+4)^{th}$ CSI-RS resource, as explained above.

As depicted, the gNB 202 has four antenna chains RX1-RX4, and indicates N_R=1 to UE 110 prior to beam failure. The gNB 202 assigns and indicates a BRACH preamble to UE 110. If a UE's preferred beam is any of the CSI-RS beams (CSI-RS #13-CSI-RS #16) that is covered by an SS beam (SS #4), the UE 110 sends the BRACH preamble within the BRACH resource that covers the CSI-RS beam.

As the gNB 202 has four RX antenna chains, the receive beam of each antenna chain is directed to each CSI-RS beam within the BRACH resource. For example, the receive beam for RX1, RX2, RX3 and RX4 has the same spatial filtering with the transmit beam of CSI #13, CSI #14, CSI #15 and CSI #16. When the UE 110 identifies a beam failure, the UE 110 measures the signal quality (e.g., RSRP) of each resource (i.e., the RS for new beam identification, in this case CSI-RS).

The UE 110 identifies that the signal quality of CSI-RS #16 is the best among the candidate resources of CSI-RS. Since the CSI-RS #16 corresponds to BRACH #4, UE 110 transmits the BRACH preamble at BRACH resource #4.

At each BRACH resource, the gNB's antenna chains RX1-RX4 receive the transmitted BRACH preamble from the UE 110 and determine whether the BRACH preamble is detected and matches any of the CSI-RS beams CSI #13-CSI #16 previously assigned by the gNB 202. At the BRACH resource #4, the gNB antenna chains RX3 and RX4 detect the BRACH preamble assigned to UE 110. However, the received power at the RX3 antenna is higher than at the RX4 antenna. Accordingly, the gNB 202 recognizes that UE 110 sent a BFRR to the gNB 202 and UE's preferred beam corresponds to CSI-RS #15.

Figure 11B:
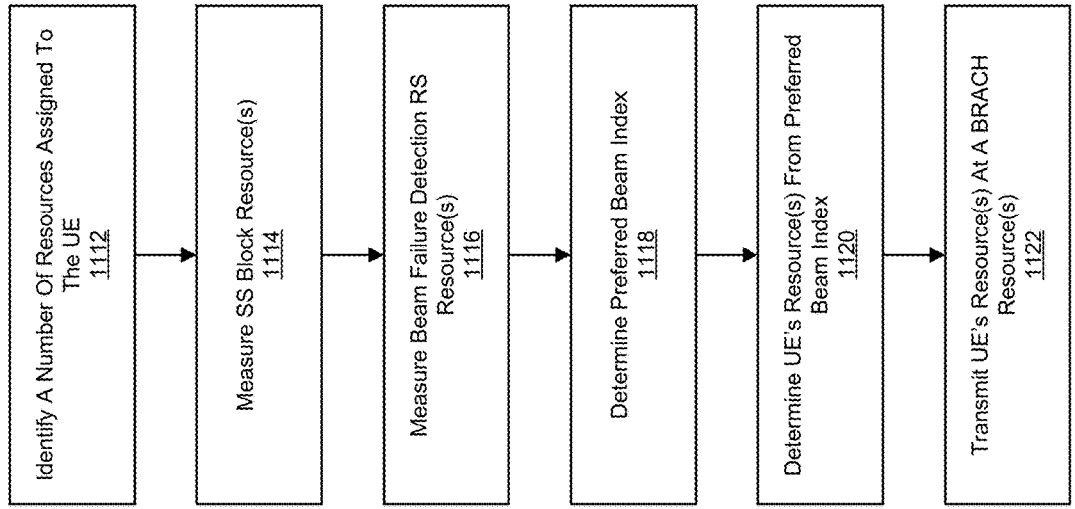
FIGS. 11A and 11B illustrate flow diagrams of procedures from a base station and user equipment.
Figure 11A:
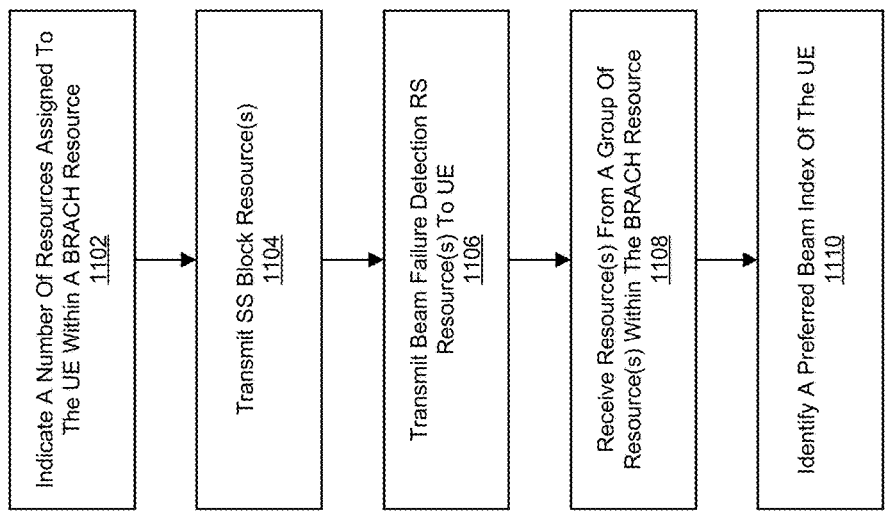

FIGS. 11A and 11B illustrate a flow diagram of procedures from a base station (FIG. 11A) and user equipment (FIG. 11B). In the flow diagrams, and for purposes of discussion, the procedures are implemented by one of the base station or user equipment. However, it is appreciated that the procedure may be implemented by any component or device disclosed in any one or more of the figures, and that the disclosed embodiments are non-limiting.

With reference to FIG. 11A, at 1102, the base station (e.g., gNB 202) indicates information corresponding to a number of resources (N_R) assigned to the user equipment within a beam failure random access channel (BRACH) resource. The gNB 202 transmits synchronization signal (SS) block resources (at 1104) and reference signal for new beam identification resources (e.g. CSI-RS) to the user equipment (at 1106), where a spatial domain of a transmit beam of each of the SS block resources covers a spatial domain of one or more of the transmit beam of each of the BRACH resources.

At 1108, the gNB 202 receives one of the resources from a group of the resources within the BRACH resource assigned to the user equipment corresponding to the BRACH resource, where a spatial domain of a receive beam of each of the BRACH resources covers a spatial domain of the transmit beam of each of the SS block resources.

At 1110, the gNB 202 identifies a preferred beam index of the user equipment based on information in the BRACH resource and the received one of the resources.

With reference to FIG. 11B, at 1112, the UE 110 identifies the number of resources (N_R) assigned by the gNB 202, and measures the SS block resources (at 1114) and the reference signal for new beam identification resources (1116), as described above.

At 1118, the UE 110 determines the preferred beam index based on the measurements at 1116, along with the UE's resource from the preferred beam index at 1120. The determined resource is transmitted to the gNB 202 at a BRACH resource at 1122.

Figure 11C:
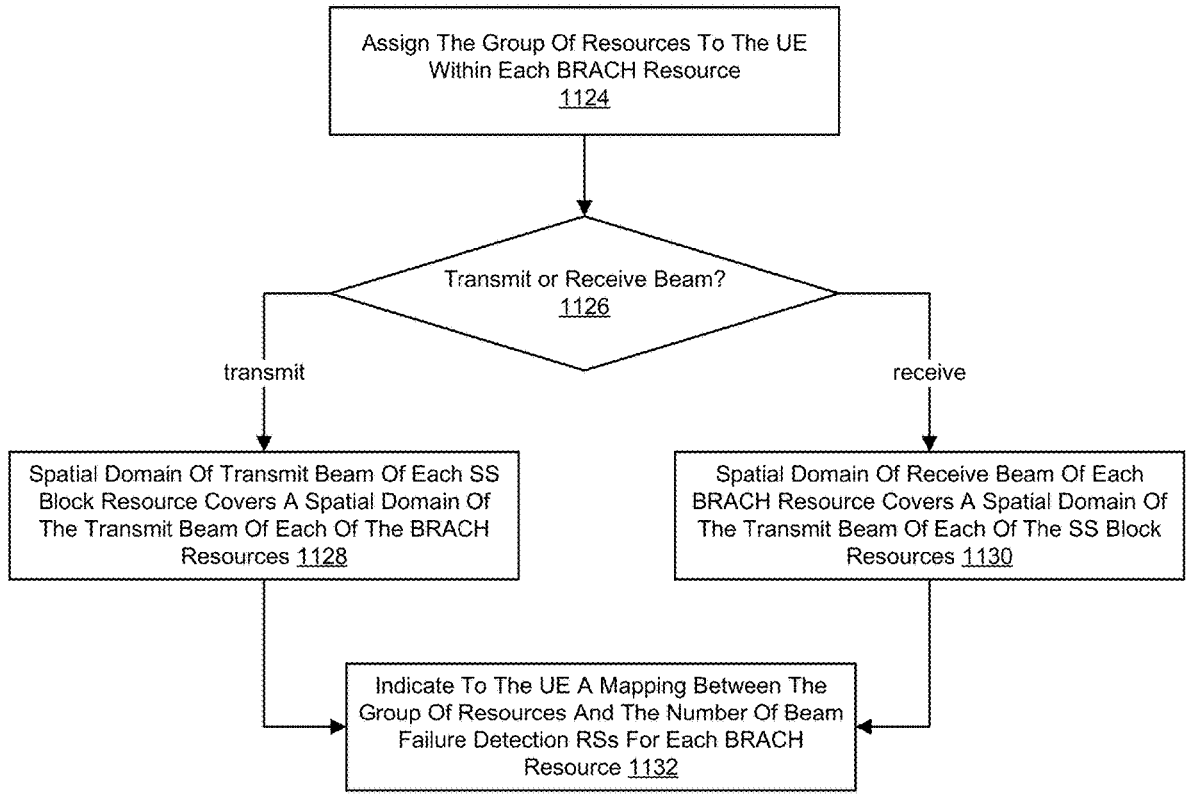
FIG. 11C illustrates a flow diagram in which group of resources are assigned to user equipment.

Turning to FIG. 11C, a flow diagram is depicted in which group of resources are assigned to the UE 110 and a mapping of the group of resources, along with information on the number of RSs for new beam identification, are indicated by the gNB 202 to the UE 110.

At 1123, the gNB 202 assigns the group of resources to the UE 110 within each BRACH resource and indicates information about the group to the UE 110. Specifically, at 1126, for a transmit beam, the spatial domain of the transmit beam of each of the SS block resources covers a spatial domain of the transmit beams of each of the BRACH resources (1128), and, for a receive beam, the spatial domain of a receive beam of each of the BRACH resources covers a spatial domain of the transmit beam of each of the SS block resources (1130).

At 1132, the gNB 202 indicates to UE 110 a mapping between the group of resources and a number of the beam failure detection RSs for each BRACH resource.

Figure 11D:
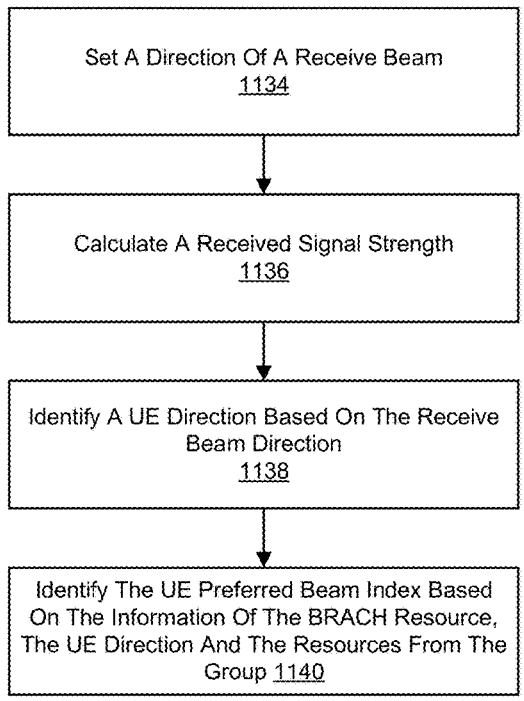
FIG. 11D illustrates a flow diagram in which a base station sets a direction of a receive beam.

Referring to FIG. 11D, the gNB 202 sets a direction of a receive beam for each of the receive RF-chains in a different direction at the BRACH resource at 1134. AT 1136, the gNB 202 calculates a received signal strength (e.g. RSRP) from each of the receive RF-chains upon receipt of the resources from a group of resources from the UE 110, and identifies the UE 110 direction based on the receive beam direction of the receive RF-chain that has the highest received signal strength at 1138. At 1140, the gNB 202 identifies the UE's preferred beam index based on the information of the BRACH resource, the UE direction and the resources from a group of resources.

Figure 12:
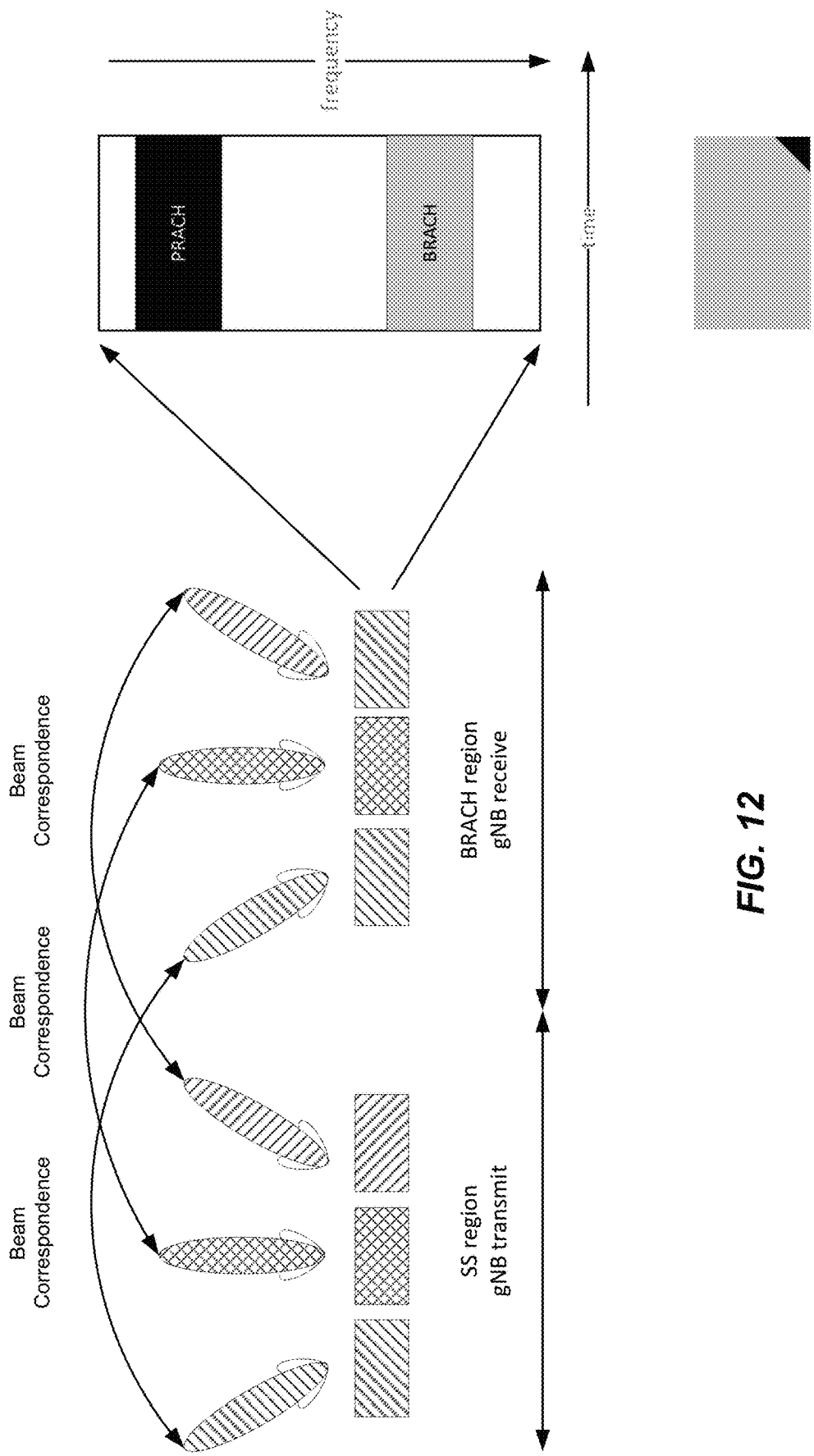
FIG. 12 illustrates a beam failure recovery request transmission based on a reference signal association.

FIG. 12 illustrates a beam failure recovery report transmission based on a reference signal association.

In RAN1 Chairman's Notes RAN1_88 b, 3GPP TSG RAN WG1 Meeting #88b, Spokane, USA, 3-7 Apr. 2017, it was agreed upon that a "beam failure detection RS at least includes periodic CSI-RS for beam management." In RAN1 Chairman's Notes RAN1_89, 3 GPP TSG RAN WG1 Meeting #89, Hangzhou, China, 15-19 May 2017, for BFRR transmission, it has been agreed upon that "when beam failure is detected and candidate beam is identified at least for the case when only CSI-RS is used for new candidate beam identification." Accordingly, a newly identified beam index n, includes at least a CSI-RS beam index, e.g., CRI, at the UE 110.

In RAN1 Chairman's Notes RAN1_89, 3 GPP TSG RAN WG1 Meeting #89, Hangzhou, China, 15-19 May 2017, it was agreed upon to "Support spatial QCL [(quasi-colocation)] assumption between antenna port(s) within a CSI-RS resource(s) and antenna port of an SS Block (or SS block time index) of a cell," while "Configuration of QCL for UE specific NR-PDCCH is by RRC and MAC-CE signaling." For example, assume a gNB 202 maintains a set of M SS signals for synchronization, $SS_1, \ldots, SS_m, \ldots, SS_M$. It follows that for any set of CSI-RS beams, e.g. $CRI_1, \ldots, CRI_n, \ldots$, gNB, can signal to the UE 110 the QCL relationship between CSI-RS and SS. As a result, from the newly identified beam index n, UE 110 can infer the corresponding SS with index m, such that $SS_m$ and $CRI_n$ is spatially QCLed.

In one embodiment, a single SS signal may hold a spatial QCL relationship with more than one CSI-RS signals. That is, a single SS signal may have a wider beam width than a single CSI-RS signal, as noted above. If $\phi_m$ is the set of CSI-RS signals (without respect to order) that hold a spatial QCL relationship with $SS_m$. Then, without loss of generality, let $CRI_n$ be the $i^{th}$ CSI-RS within the signal set $\phi_m$. Since n can be uniquely identified by the pair {m,i}, it is clear that in order to for gNB 202 to obtain the newly identified beam index n, it is sufficient for UE 110 to signal the SS index m for which $CRI_n$ is spatially QCLed with, as well as the secondary index i of $CRI_n$ within the signal set $\phi_m$.

In RAN1 Chairman's Notes RAN1_89, 3 GPP TSG RAN WG1 Meeting #89, Hangzhou, China, 15-19 May 2017, it was agreed upon to support "Non-contention based channel based on PRACH, which uses a resource orthogonal to resources of other PRACH transmissions, at least for FDM case," as shown in FIG. 12 where the PRACH resource for initial access is FDM'ed with the BRACH (BFR RACH) resource for BFR (beam failure recover). In one embodiment, the diagram illustrates an SS region where multiple SS signals (SS #1-SS #3) are transmitted by the gNB 202 using multiple transmit precoders, as well as a BRACH region where multiple BRACH resources (BRACH #1-BRACH #3) are allocated together with PRACH resources in a FDM manner while gNB 202 receives using multiple receive precoders/combiners. For each SS signal using a particular transmit precoder, there is a unique BRACH resource using a beam corresponding receiver combiner with a fixed relative time-frequency relation. In other words, for M SS signals $SS_1, \ldots, SS_m, \ldots, SS_M$, there are M BRACH resources $BRACH_1, \ldots, BRACH_m, \ldots, BRACH_M$ with a one-to-one mapping relationship.

From the perspective of the UE 110, the SS index m (for which $CRI_n$ is spatially QCLed) can be signaled in an implicit manner by sending the BFRR on the mth BRACH resource $BRACH_m$ which holds a one-to-one mapping relationship with $SS_m$. By analyzing which BRACH resource is being used, gNB 202 can detect the SS index m.

In one embodiment, the secondary index i of $CRI_n$ within the signal set $\phi_m$ can be signaled separately, using several different methods. For example, the secondary index i can be signaled explicitly when the UE 110 has obtained a transmission grant. In another example, each UE 110 may be assigned multiple unique sequences in advance with each sequence representing one secondary index within the signal set $\phi_m$. As a result, the secondary index i can be signaled to gNB 202 implicitly by selection of a proper sequence at the UE side. By analyzing the preamble sequence being used, gNB 202 can detect the UE 110 identity and the secondary index i.

In still another example, each UE 110 may be assigned multiple BRACH sub-resources, on which the preamble sequence may be transmitted, where each BRACH sub-resource represents one secondary index within the signal set $\phi_m$. As a result, the secondary index i can be signaled to gNB 202 implicitly by selection of a proper BRACH resource at the UE side. By analyzing the BRACH resource being used, gNB 202 can detect the secondary index i.

Additional embodiments may include any one of the following aspects: the resource from the group of one or more resources are different BRACH preambles; the resources from the group of one or more resources are a BRACH preamble assigned in different time slots assigned within the BRACH resource; the resources from the group of one or more resources are a BRACH preamble assigned in different frequency blocks assigned within the BRACH resource; the CSI-RS is used as the beam failure detection reference signal; the information on mapping between one and the number of the beam failure detection reference signals within each BRACH resource is predetermined without explicit indication; the $k^{th}$ beam failure detection reference signal is mapped to mod(K, N_R) resource assigned to the UE, wherein K denotes the third number of the beam failure detection reference signals for each BRACH resource, N_R denotes the resources from the group of one or more resources assigned to the UE, and mod(x, y) operator denotes the remainder after division of x by y.

Figure 13A:
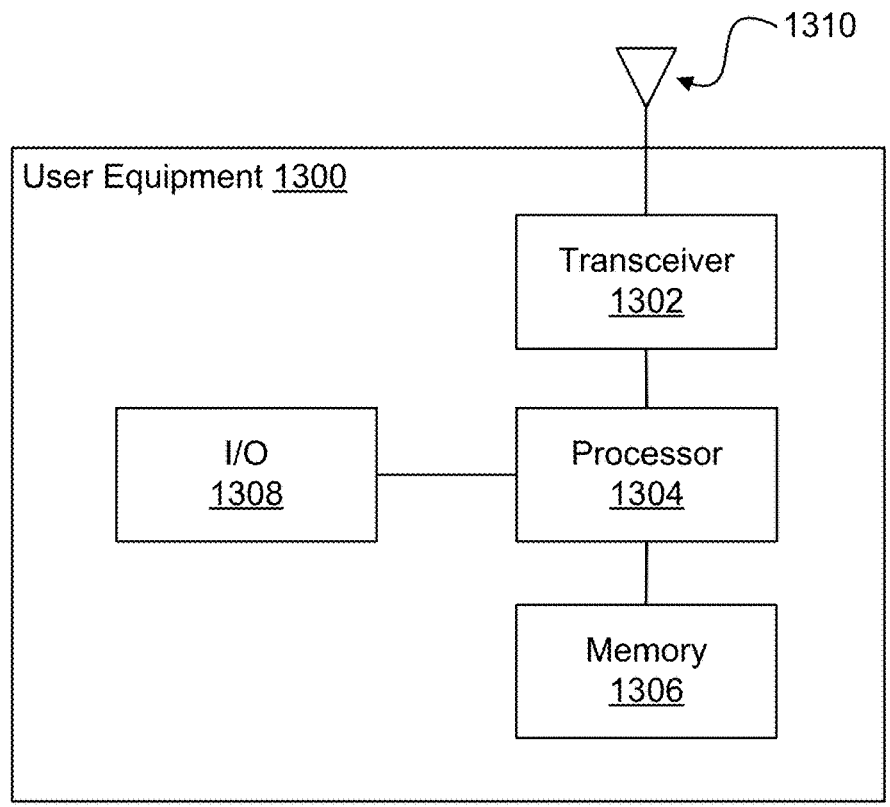
FIG. 13A illustrates example user equipment that may implement the methods and teachings according to this disclosure.

FIG. 13A illustrates example user equipment that may implement the methods and teachings according to this disclosure. As shown in the figure, the UE 1300 includes at least one processor 1304. The processor 1304 implements various processing operations of the UE 1300. For example, the processor 1304 may perform signal coding, data processing, power control, input/output processing, or any other functionality enabling the UE 1300 to operate in the system 100 (FIG. 1). The processor 1304 may include any suitable processing or computing device configured to perform one or more operations. For example, the processor 1304 may include a microprocessor, microcontroller, digital signal processor, field programmable gate array, or application specific integrated circuit.

The UE 1300 also includes at least one transceiver 1302. The transceiver 1302 is configured to modulate data or other content for transmission by at least one antenna 1310. The transceiver 1302 is also configured to demodulate data or other content received by the at least one antenna 1310. Each transceiver 1302 may include any suitable structure for generating signals for wireless transmission and/or processing signals received wirelessly. Each antenna 1310 includes any suitable structure for transmitting and/or receiving wireless signals. It is appreciated that one or multiple transceivers 1302 could be used in the UE 1300, and one or multiple antennas 1310 could be used in the UE 1300. Although shown as a single functional unit, a transceiver 1302 may also be implemented using at least one transmitter and at least one separate receiver.

The UE 1300 further includes one or more input/output devices 1308. The input/output devices 1308 facilitate interaction with a user. Each input/output device 1308 includes any suitable structure for providing information to or receiving information from a user, such as a speaker, microphone, keypad, keyboard, display, or touch screen.

In addition, the UE 1300 includes at least one memory 1306. The memory 1306 stores instructions and data used, generated, or collected by the UE 1300. For example, the memory 1306 could store software or firmware instructions executed by the processor(s) 1304 and data used to reduce or eliminate interference in incoming signals. Each memory 1306 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 13B:
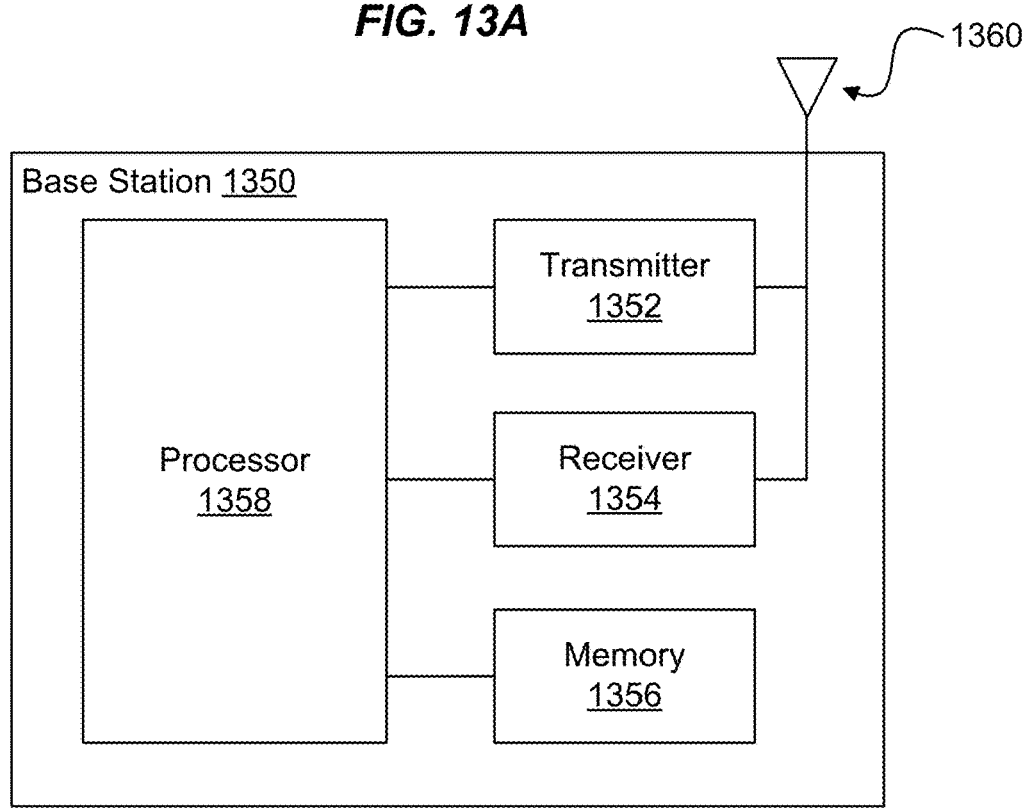
FIG. 13B illustrates example base station that may implement the methods and teachings according to this disclosure.

FIG. 13B illustrates example base station that may implement the methods and teachings according to this disclosure. As shown in the figure, the base station 1350 includes at least one processor 1358, at least one transmitter 1352, at least one receiver 1354, one or more antennas 1360, and at least one memory 1356. The processor 1358 implements various processing operations of the base station 1350, such as signal coding, data processing, power control, input/output processing, or any other functionality. Each processor 1358 includes any suitable processing or computing device configured to perform one or more operations. Each processor 1358 could, for example, include a microprocessor, microcontroller, digital signal processor, field programmable gate array, or application specific integrated circuit.

Each transmitter 1352 includes any suitable structure for generating signals for wireless transmission to one or more UEs or other devices. Each receiver 1354 includes any suitable structure for processing signals received wirelessly from one or more UEs or other devices. Although shown as separate components, at least one transmitter 1352 and at least one receiver 1354 could be combined into a transceiver. Each antenna 1360 includes any suitable structure for transmitting and/or receiving wireless signals. While a common antenna 1360 is shown here as being coupled to both the transmitter 1352 and the receiver 1354, one or more antennas 1360 could be coupled to the transmitter(s) 1352, and one or more separate antennas 1360 could be coupled to the receiver(s) 1354. Each memory 1356 includes any suitable volatile and/or non-volatile storage and retrieval device(s).

Figure 14:
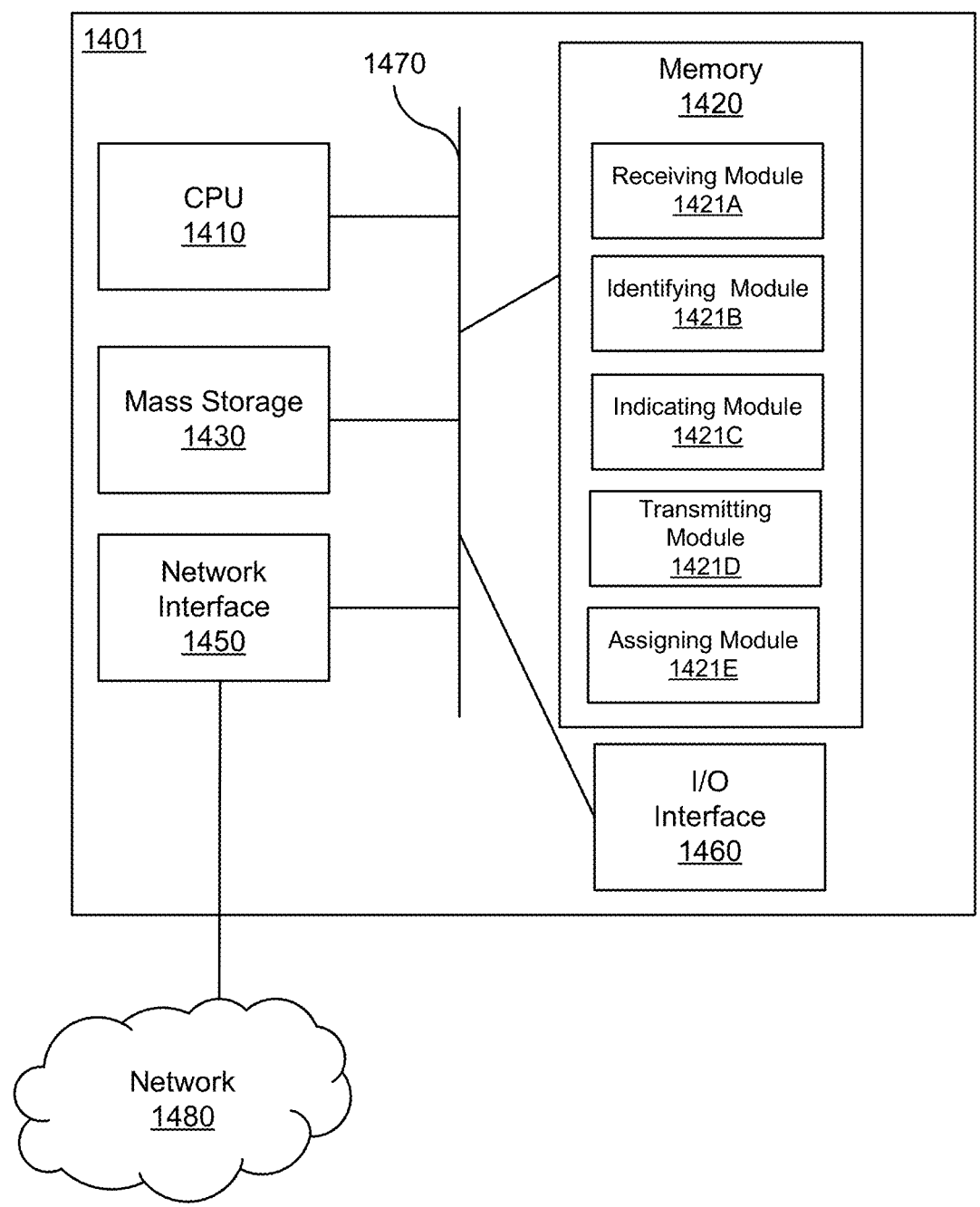
FIG. 14 illustrates a block diagram of a network system that can be used to implement various embodiments.

FIG. 14 is a block diagram of a network device that can be used to implement various embodiments. Specific network devices may utilize all of the components shown, or only a subset of the components, and levels of integration may vary from device to device. Furthermore, the network device 1400 may contain multiple instances of a component, such as multiple processing units, processors, memories, transmitters, receivers, etc. The network device 1400 may comprise a processing unit 1401 equipped with one or more input/output devices, such as network interfaces, storage interfaces, and the like. The processing unit 1401 may include a central processing unit (CPU) 1410, a memory 1420, a mass storage device 1430, and an I/O interface 1460 connected to a bus 1470. The bus 1470 may be one or more of any type of several bus architectures including a memory bus or memory controller, a peripheral bus or the like.

The CPU 1410 may comprise any type of electronic data processor. The memory 1420 may comprise any type of system memory such as static random access memory (SRAM), dynamic random access memory (DRAM), synchronous DRAM (SDRAM), read-only memory (ROM), a combination thereof, or the like. In an embodiment, the memory 1420 may include ROM for use at boot-up, and DRAM for program and data storage for use while executing programs. In embodiments, the memory 1420 is non-transitory. In one embodiment, the memory 1420 includes a receiving module 1421A receiving one of the resources from a group of the one or more resources within the BRACH resource assigned to the user equipment corresponding to the BRACH resource, an identifying module 1421B identifying a preferred beam index of the user equipment based on information in the BRACH resource and the received one of the resources, and an assigning module assigning the group of the one or more resources to the user equipment within each BRACH resource and indicating information on the group to the user equipment, an indicating module 1421C indicating one or more resources assigned to the user equipment within a beam failure random access channel (BRACH) resource, and a transmitting module 1421D transmitting one or more synchronization signal (SS) block resources and one or more beam failure detection reference signal resources to the user equipment.

The mass storage device 1430 may comprise any type of storage device configured to store data, programs, and other information and to make the data, programs, and other information accessible via the bus 1470. The mass storage device 1430 may comprise, for example, one or more of a solid state drive, hard disk drive, a magnetic disk drive, an optical disk drive, or the like.

The processing unit 1401 also includes one or more network interfaces 1450, which may comprise wired links, such as an Ethernet cable or the like, and/or wireless links to access nodes or one or more networks 1480. The network interface 1450 allows the processing unit 1401 to communicate with remote units via the networks 1480. For example, the network interface 1450 may provide wireless communication via one or more transmitters/transmit antennas and one or more receivers/receive antennas. In an embodiment, the processing unit 1401 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying a user equipment beam index in a base station, comprising:

assigning, by the base station, one or more random access channel resources for beam failure recovery to a user equipment, wherein the resources comprise one or more preamble indexes each associated with one or more synchronization signals (SSs) or one or more channel state information reference signals (CSI-RSs) transmitted by the base station;

transmitting, by the base station and for beam failure recovery, a first CSI-RS of the one or more CSI-RSs on a beam;

receiving, by the base station and from the user equipment, a preamble corresponding to an assigned preamble index from the one or more preamble indexes, the assigned preamble index being associated with an SS of the one or more SSs that is quasi-colocated with the first CSI-RS; and identifying, by the base station, a beam for communicating with the user equipment based on the preamble.

2. The method of claim 1, wherein the preamble is received on a first resource within the resources.

3. The method of claim 2, wherein the step of identifying the beam is also based on the first resource.

4. The method of claim 3, wherein the first resource is associated with the SS that is quasi-colocated with the first CSI-RS.

5. The method of claim 1, further comprising:

calculating a received signal quality from each of a plurality of receive RF-chains set in different directions;

identifying, in accordance with the received signal qualities, a receive direction of a receive RF-chain that has a highest received signal quality; and wherein identifying the beam is also based on the receive direction.

6. The method of claim 1, further comprising transmitting, by the base station, an identification of signals for beam failure recovery, the signals comprising at least one SS and a plurality of CSI-RSs, the at least one SS being quasi-colocated with a plurality of the CSI-RSs, the at least one SS being associated with at least one of the preamble indexes.

7. The method of claim 1, wherein the receiving step is in response to the transmitting of the first CSI-RS.

8. The method of claim 1, wherein the resources comprise at least one preamble index associated with a CSI-RS transmitted by the base station.

9. The method of claim 1, wherein the resources are beam failure random access channel resources.

10. A device for identifying a user equipment beam index in a base station, comprising:

a non-transitory memory storage comprising instructions; and one or more processors in communication with the memory, wherein the one or more processors execute the instructions to:

assign, by the base station, one or more random access channel resources for beam failure recovery to a user equipment, wherein the resources comprise one or more preamble indexes each associated with one or more synchronization signals (SSs) or one or more channel state information reference signals (CSI-RSs) transmitted by the base station;

transmit, by the base station and for beam failure recovery, a first CSI-RS of the one or more CSI-RSs on a beam;

receive, by the base station and from the user equipment, a preamble corresponding to an assigned preamble index from the one or more preamble indexes, the assigned preamble index being associated with an SS of the one or more SSs that is quasi-colocated with the first CSI-RS; and identify, by the base station, a beam for communicating with the user equipment based on the preamble.

11. The device of claim 10, wherein the preamble is received on a first resource within the resources.

12. The device of claim 11, wherein the step of identifying the beam is also based on the first resource.

13. The device of claim 12, wherein the first resource is associated with the SS that is quasi-colocated with the first CSI-RS.

14. The device of claim 10, wherein the one or more processors further execute the instructions to:
calculate a received signal quality from each of a plurality of receive RF-chains set in different directions;
identify, in accordance with the received signal qualities, a receive direction of a receive RF-chain that has a highest received signal quality; and
wherein identifying the beam is also based on the receive direction.

15. The device of claim 10, wherein the one or more processors further execute the instructions to transmit, by the base station, an identification of signals for beam failure recovery, the signals comprising at least one SS and a plurality of CSI-RSs, the at least one SS being quasi-colocated with a plurality of the CSI-RSs, the at least one SS being associated with at least one of the preamble indexes.

16. The device of claim 10, wherein the one or more processors further execute the instructions to receive the preamble in response to the transmitting of the first CSI-RS.

17. The device of claim 10, wherein the resources comprise at least one preamble index associated with a CSI-RS transmitted by the base station.

18. The device of claim 10, wherein the resources are beam failure random access channel resources.

19. A method for communicating a new beam index to a base station, comprising:
receiving, by a user equipment and from the base station, an assignment of one or more random access channel resources for beam failure recovery, wherein the resources comprise one or more preamble indexes each associated with one or more synchronization signals (SSs) or one or more channel state information reference signals (CSI-RSs) transmitted by the base station;
receiving, by the user equipment and from the base station, for beam failure recovery, a first CSI-RS of the one or more CSI-RSs on a beam;
selecting, based on a measurement of the first CSI-RS, the first CSI-RS of the one or more CSI-RSs for beam failure recovery; and
transmitting, by the user equipment to the base station, a preamble corresponding to an assigned preamble index from the one or more preamble indexes, the assigned preamble index being associated with an SS of the one or more SSs that is quasi-colocated with the first CSI-RS.

20. The method of claim 19, further comprising measuring, by the user equipment, a received power associated with the first CSI-RS, and wherein the step of selecting is based on the measured received power.

21. The method of claim 19, wherein the transmitting step is in response to selecting the first CSI-RS.

22. The method of claim 19, wherein the preamble is transmitted on a first resource within the resources.

23. The method of claim 22, wherein the first resource is associated with the SS that is quasi-colocated with the first CSI-RS.

24. The method of claim 19, further comprising receiving, by the user equipment, an identification of signals for beam failure recovery, the signals comprising at least one SS and a plurality of CSI-RSs, the at least one SS being quasi-colocated with a plurality of the CSI-RSs, the at least one SS being associated with at least one of the preamble indexes.

25. The method of claim 19, wherein the resources comprise at least one preamble index associated with a CSI-RS transmitted by the base station.

26. The method of claim 19, wherein the resources are beam failure random access channel resources.

27. A device for communicating a new beam index to a base station, comprising:
a non-transitory memory storage comprising instructions; and
one or more processors in communication with the memory, wherein the one or more processors execute the instructions to:
receive, by a user equipment and from the base station, an assignment of one or more random access channel resources for beam failure recovery, wherein the resources comprise one or more preamble indexes each associated with one or more synchronization signals (SSs) or one or more channel state information reference signals (CSI-RSs) transmitted by the base station;
receive, by the user equipment and from the base station, for beam failure recovery, a first CSI-RS of the one or more CSI-RSs on a beam;
select, based on a measurement of the first CSI-RS, the first CSI-RS of the one or more CSI-RSs for beam failure recovery; and
transmit, by the user equipment to the base station, a preamble corresponding to an assigned preamble index from the one or more preamble indexes, the assigned preamble index being associated with an SS of the one or more SSs that is quasi-colocated with the first CSI-RS.

28. The device of claim 27, wherein the one or more processors further execute the instructions to measure, by the user equipment, a received power associated with the first CSI-RS, and wherein the step of selecting is based on the measured received power.

29. The device of claim 27, wherein the transmitting the preamble is in response to selecting the first CSI-RS.

30. The device of claim 27, wherein the preamble is transmitted on a first resource within the resources.

31. The device of claim 30, wherein the first resource is associated with the SS that is quasi-colocated with the first CSI-RS.

32. The device of claim 27, wherein the one or more processors further execute the instructions to receive, by the user equipment, an identification of signals for beam failure recovery, the signals comprising at least one SS and a plurality of CSI-RSs, the at least one SS being quasi-colocated with a plurality of the CSI-RSs, the at least one SS being associated with at least one of the preamble indexes.

33. The device of claim 27, wherein the resources comprise at least one preamble index associated with a CSI-RS transmitted by the base station.

34. The device of claim 27, wherein the resources are beam failure random access channel resources.

* * * * *